US012688759B2

(12) United States Patent
Hagen et al.

(10) Patent No.: US 12,688,759 B2
(45) Date of Patent: Jul. 21, 2026

(54) VERIFICATION OF ITEMS PLACED IN PHYSICAL SHOPPING CART

(71) Applicant: Target Brands, Inc., Minneapolis, MN (US)

(72) Inventors: Todd A. Hagen, Minneapolis, MN (US); Andrew Wipf, Minneapolis, MN (US); Donnie Tolbert, Minneapolis, MN (US); Arne Wilkin, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 69 days.

(21) Appl. No.: 18/792,231

(22) Filed: Aug. 1, 2024

(65) Prior Publication Data

US 2024/0395117 A1 Nov. 28, 2024

Related U.S. Application Data

(63) Continuation of application No. 17/964,509, filed on Oct. 12, 2022, now Pat. No. 12,100,271.

(60) Provisional application No. 63/340,792, filed on May 11, 2022, provisional application No. 63/276,460, filed on Nov. 5, 2021.

(51) Int. Cl.
*G07G 1/00* (2006.01)

(52) U.S. Cl.
CPC ......... *G07G 1/0063* (2013.01); *G07G 1/0072* (2013.01); *G07G 1/0081* (2013.01); *G07G 1/009* (2013.01)

(58) Field of Classification Search
CPC .. G07G 1/0063; G07G 1/0072; G07G 1/0081; G07G 1/009
See application file for complete search history.

(56) References Cited

U.S. PATENT DOCUMENTS

| | | | |
|---|---|---|---|
| 6,484,939 | B1 | 11/2002 | Blaeuer |
| 6,997,382 | B1 | 2/2006 | Bhri |
| 7,225,980 | B2 | 6/2007 | Ku et al. |

(Continued)

OTHER PUBLICATIONS

GitHub.com [online], "SmartShoppingSystem: Smart shopping cart using arduino and mobile application for smart shopping," Jun. 30, 2018, retrieved on Aug. 18, 2021, retrieved from URL<https://github.com/Jay341997/SmartShoppingSystem>, 8 pages.

(Continued)

*Primary Examiner* — Nathan A Mitchell
(74) *Attorney, Agent, or Firm* — Barnes & Thornburg LLP

(57) ABSTRACT

In some implementations, a method performed by data processing apparatuses includes receiving, by an item verification engine, a scan notification indicating that a mobile computing device has scanned an item. In response to receiving the scan notification, the item verification engine provides an instruction for a cart computing system to activate item sensors on a shopping cart. The item verification engine receives sensor data collected by the item sensors as a result of the item having been placed in the shopping cart. The item verification engine receives item verification data for verifying the scanned item from the mobile computing device, performs a verification of the item based on the sensor data and the item verification data, and provides verification results for presentation by the mobile computing device.

20 Claims, 12 Drawing Sheets

(56) References Cited

U.S. PATENT DOCUMENTS

| | | | | |
|---|---|---|---|---|
| 7,934,647 | B1 | 5/2011 | Mims et al. | |
| 10,275,821 | B2 | 4/2019 | Clark et al. | |
| 10,800,440 | B2 * | 10/2020 | Li | B62B 3/1424 |
| 10,891,455 | B1 * | 1/2021 | Crooks | G06V 10/17 |
| 11,636,533 | B1 * | 4/2023 | Vora | B62B 3/1428 705/27.1 |
| 11,741,447 | B1 | 8/2023 | Matheson | |
| 2008/0243626 | A1 | 10/2008 | Stawar et al. | |
| 2009/0322481 | A1 * | 12/2009 | Marr, III | H04Q 9/00 340/10.1 |
| 2010/0136918 | A1 | 6/2010 | Bonner | |
| 2014/0175164 | A1 | 6/2014 | Allard | |
| 2014/0214577 | A1 * | 7/2014 | Acker, Jr. | G01G 19/12 705/23 |
| 2015/0006319 | A1 | 1/2015 | Thomas | |
| 2017/0161703 | A1 * | 6/2017 | Dodia | G07G 1/0072 |
| 2017/0359254 | A1 | 12/2017 | Oran | |
| 2018/0066978 | A1 * | 3/2018 | Millhouse | G01G 7/02 |
| 2018/0158056 | A1 | 6/2018 | Williams | |
| 2018/0165670 | A1 | 6/2018 | Bacallao | |
| 2018/0197218 | A1 * | 7/2018 | Mallesan | G07G 1/0054 |
| 2018/0314863 | A1 | 11/2018 | Gao | |
| 2019/0118844 | A1 * | 4/2019 | Li | G07G 1/0081 |
| 2019/0125106 | A1 | 5/2019 | Bode | |
| 2019/0279185 | A1 * | 9/2019 | Cheng | B62B 5/0096 |
| 2019/0337549 | A1 | 11/2019 | Lobo | |
| 2020/0034812 | A1 * | 1/2020 | Nemati | G06Q 20/14 |
| 2020/0082373 | A1 | 3/2020 | Kozak | |
| 2020/0151696 | A1 | 5/2020 | Plocher | |
| 2020/0198680 | A1 | 6/2020 | Hagen | |
| 2020/0275059 | A1 * | 8/2020 | De Bonet | G06V 10/141 |
| 2021/0090050 | A1 * | 3/2021 | Kaneko | G06Q 20/208 |
| 2022/0198550 | A1 * | 6/2022 | Meidar | G06Q 20/20 |
| 2022/0309485 | A1 * | 9/2022 | Hamada | B62B 3/1416 |
| 2023/0297991 | A1 * | 9/2023 | Suetsugu | G07G 3/003 705/17 |
| 2023/0306428 | A1 | 9/2023 | Ratnakaram | |
| 2025/0307907 | A1 * | 10/2025 | Vora, V | B62B 3/1464 |

OTHER PUBLICATIONS

Megalingam et al., “Design and Implementation of an Android Application for Smart Shopping,” International Conference on Communication and Signal Processing, Apr. 4, 2019, pp. 0470-0474.

Mekruksavanich, Sakorn. “The smart shopping basket based on iot applications.” 2019 IEEE 10th International Conference on Software Engineering and Service Science (ICSESS), 4 pages.

Shahroz et al., “IoT-Based Smart Shopping Cart Using Radio Frequency Identification,” IEEE Access, Apr. 8, 2020, 8:68426-68438.

Subudhi, Sudipta Ranjan, and R. N. Ponnalagu. “An intelligent shopping cart with automatic product detection and secure payment system.” 2019 IEEE 16th India Council International Conference (INDICON), 4 pages.

* cited by examiner

840

860

VERIFICATION OF ITEMS PLACED IN PHYSICAL SHOPPING CART

CROSS-REFERENCE TO RELATED APPLICATIONS

This application is a continuation of U.S. patent application Ser. No. 17/964,509, filed Oct. 12, 2022, which claims priority to U.S. Provisional Application Ser. No. 63/340,792, filed May 11, 2022 and U.S. Provisional Application Ser. No. 63/276,460, filed Nov. 5, 2021, the disclosures of which are incorporated by reference in their entirety.

TECHNICAL FIELD

This specification generally relates to physical shopping carts that are used in physical retail stores and other shopping establishments, and to the verification of items placed in such physical shopping carts.

BACKGROUND

Physical shopping charts have been used in retail stores and a variety of other shopping establishments (e.g., grocery stores, home improvement stores) to provide customers with a way to collect and transport items to a check-out area (e.g., point of sale terminal, cashier). Although physical shopping carts have a variety of different form factors and configurations, physical shopping carts generally include a frame, an area for the placement of items (e.g., basket, bin, platform), and a handle or other mechanism for customers to move the cart around. Physical shopping carts can include wheels on which the frame is mounted to permit the cart to be pushed around a store. Alternatively, physical shopping carts can include a handle or other mechanism permitting users to carry carts around a store. Some physical shopping carts (e.g., smart carts) can be equipped with a display device (e.g., a touchscreen) that can present a customer's shopping list, various promotional offers, and way-finding capabilities. Some physical shopping carts can be equipped with scanners/sensors that can be used to identify items in the store.

Some retail environments have permitted guests to use scan and go technology on their mobile devices (e.g., smartphones) to complete retail checkout in the retail environment instead of at a checkout lane or self-checkout lane. Scan and go technology can move the product scanning process further away from review of retail employee(s). Some scan and go systems have used employees to manually check and verify that the guest is leaving the store with only those items scanned and purchased on their mobile device before exiting the retail environment.

SUMMARY

This document generally describes computer systems, processes, program products, and devices for verifying items being placed in physical shopping carts. For example, physical shopping carts can be equipped with one or more product detection systems (e.g., scanners, sensors, cameras) that can electronically detect products that are placed in physical shopping carts. Mobile computing devices can be associated with (and optionally mounted on) the physical shopping carts to provide a variety of enhanced shopping cart features not possible with conventional physical shopping carts, such as electronically tracking the contents of a shopping cart, checking-out from automated checkout stations (instead of at conventional checkout areas, such as point of sale terminals), and others. A shopping cart (e.g., a smart cart) can be paired with a customer's personal mobile computing device (e.g., a smartphone), for example, and the customer's mobile device can run a mobile application that can communicate with a store's server systems. While shopping, for example, customers can use their mobile devices to scan items that they intend to purchase, before placing the items in their shopping carts. In response to an item scan, for example, the mobile device can retrieve item verification data that is specifically for use in verifying a scanned item, based on one or more physical sensors (e.g., infrared (IR) sensors, sound sensors, weight sensors, cameras, etc.) that are on the customer's shopping cart. When the customer places the item in the shopping cart, for example, the cart's physical sensors can detect the item, and can provide the sensor data to a verification engine (e.g., executed by the mobile device or a cart computing system), for comparison against the item verification data. Notifications regarding whether items are verified can be provided to the customer through the customer's mobile device and/or the shopping cart, and items can be added to a virtual shopping cart (e.g., maintained by the mobile device and/or server system) for a current shopping trip. If a sufficient quantity of items in the user's virtual shopping cart have been verified, for example, the mobile application running on the customer's mobile device can notify the user that an automated checkout process may be available to the customer.

The disclosed technology can be used in combination with and to improve mobile device-based scanning of items and checkout processes, such as scan and go checkout systems. For example, existing scan and go technology presents a variety of problems, including guests potentially taking a different item than the item scanned and misidentifying the quantity of products scanned versus taken, both of which can result in shortages for the retailer. Additionally, manual checks to ward against shortages with scan and go checkouts can present a variety of drawbacks, such as slowing down the checkout/departure process (mitigating some of the benefits of using scan and go technology), increasing labor costs for dedicated manually checkers, and potentially failing to remedy these issues due to potential human error during the checking process. The disclosed technology can resolve these and/or other problems with scan and go type systems. For example, the disclosed technology can provide for more accurate, granular, and efficient validation of scanned items as shopping progresses-meaning verifying that the physical item added to a shopping cart is the item that was scanned (and in the same quantity as recorded as part of the scan). This can provide a variety of benefits, such as reducing shortages and other inconsistencies between the physical goods that a guest leaves with and those that the guest pays for during the checkout process. For example, a guest may only be presented with an option to checkout on their mobile device if each scanned item has been validated by the shopping cart, and may otherwise be directed to physical checkout lanes if there are inconstancies between the scanned items and the physical items in the cart. This can permit for guests with fully validated carts to more quickly and readily checkout, can reduce the manual effort to manage such checkout processes for retailers, and can provide for greater levels of trust between retailers and guests using scan and go type systems, which can increase the prevalence and availability of such systems for guests across retail environments.

In some implementations, a method can be performed by data processing apparatuses. The method includes receiving, by an item verification engine, a scan notification indicating that a mobile computing device has scanned an item; in response to receiving the scan notification, providing, by the item verification engine, an instruction for a cart computing system to activate one or more item sensors on a shopping cart; receiving, by the item verification engine and from the cart computing system, sensor data collected by the one or more item sensors as a result of the item having been placed in the shopping cart; receiving, by the item verification engine and from the mobile computing device, item verification data for verifying the scanned item; after receiving the sensor data and the item verification data, performing a verification of the item based on the sensor data and the item verification data; and providing, by the item verification engine, verification results based on performing the verification of the item, for presentation by the mobile computing device.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. The item verification engine can be executed by the mobile computing device. The item verification engine can be executed by the cart computing system. A pairing operation that associates the mobile computing device with the shopping cart can be performed. Before the item verification data is received by the item verification engine from the mobile computing device, the item verification data can be obtained by the mobile computing device from a server system that maintains item verification data for a plurality of different items. The server system can be configured to provide item verification data for verifying the scanned item, in response to receiving, from the mobile computing device, an item data request that includes an identifier of the scanned item. The item data request can include an identifier of the mobile computing device or an identifier of the shopping cart. The item verification data for verifying the scanned item can correspond to sensor data provided by a type of sensor that exists on the shopping cart. Performing the verification of the item based on the sensor data and the item verification data can include determining whether there is a threshold match between the sensor data and the item verification data, for each type of sensor that exists on the shopping cart. Performing the verification of the item based on the sensor data and the item verification data can include adjusting the sensor data or the item verification, based on motion data from one or more motion detection devices on the shopping cart. The item verification engine can provide verification results for performing the verification of the item, for presentation by the cart computing system.

The systems, devices, program products, and processes described throughout this document can, in some instances, provide one or more of the following advantages. A mobile device can be leveraged to conduct long-ranged communications with a server that maintains item information, and the information can be provided as needed by the mobile device to a smart cart using short-ranged communication. Thus, the smart cart may not need to communicate with the server directly, or to store and update data for many items, thereby potentially conserving communication, storage, and/or computing resources of the smart cart. Also, the smart cart can potentially be equipped with fewer (and more robust) sensing devices and output devices, as the user's mobile device is used for performing an initial item scan and for providing output to the user. Thus, the smart cart does not need to be equipped with a display screen or a scanner. Sensors for performing item verification can include infrared (IR) devices, microphones, and/or scales, which tend to be more robust than cameras (thus saving wear and tear on the carts). Battery power consumed by sensing devices can be conserved, by activating the sensing devices in response to item scans. By activating sensing devices immediately prior to a time when they are likely to be used and by activating a limited sensor timer, collected data can be limited to a time period corresponding to the sensor.

Other features, aspects and potential advantages will be apparent from the accompanying description and figures.

DESCRIPTION OF DRAWINGS

Like reference symbols in the various drawings indicate like elements.

DETAILED DESCRIPTION

This document describes technology that can verify items placed in physical shopping carts. For example, a shopping cart (e.g., a smart cart) can be equipped with an item detection system that is configured to automatically detect items that are placed in (and optionally, removed from) the shopping cart, and can be paired with a customer's mobile device that is in communication with a store's server systems. While shopping, customers can use their mobile devices to scan items that they intend to purchase. In response to scanning an item, the mobile device can provide verification data for the item (e.g., from the store's server systems) to the shopping cart, such as physical dimensions of the item, weight of the item, a sound profile of the item, and so forth. The shopping cart can use its item detection system (e.g., including one or more physical sensors) to collect sensor data associated with the item being placed in the cart, and a verification process can be performed to verify whether the item being added to the cart is the same item that was scanned by the mobile device, based on the sensor data and the verification data. A notification can be provided by the mobile device indicating whether the item added to the shopping cart is the scanned item, along with possibly providing information indicative of the verification results on the cart itself (e.g., green light for success, red light for failure). The state of the cart and the verification of its content can be maintained by the mobile device, which can then use this information to notify the customer of an available checkout process (e.g., express, Point of Sale (POS) terminal), and/or to facilitate the checkout process.

Figure 1:
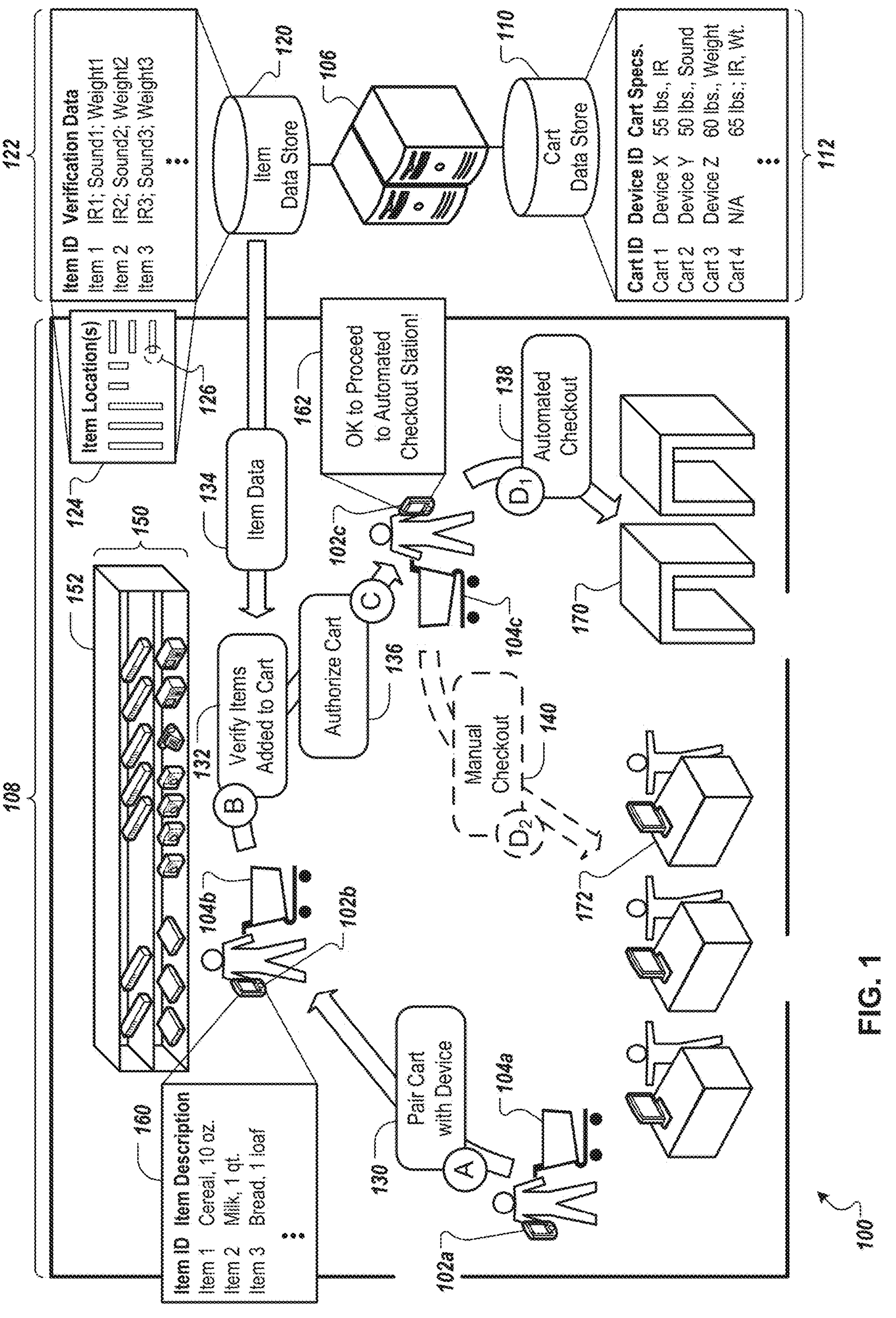
FIG. 1 is a conceptual drawing of an example retail environment, and an example system for verifying items placed in physical shopping carts.

FIG. 1 is a conceptual drawing of an example shopping environment 108, and an example system 100 for verifying items placed in physical shopping carts, as represented in example stages (A) to (D). Stages (A) to (D), for example, may occur in the illustrated sequence, a different sequence, and/or two or more stages (A) to (D) may be concurrent. In some examples, one or more stages (A) to (D) may be repeated multiple times during a shopping trip.

The shopping environment 108 can be a physical retail store, warehouse, or another sort of facility in which various items 150 (e.g., physical products) are stored in various storage units 152 (e.g., shelves, racks, bins, etc.) and are available for selection by various system users (e.g., customers, employees, or other system users). In general, each system user can employ a respective personal mobile device and a respective shopping cart while traversing the shopping environment 108 and adding items to their cart. In the present example, a system user employs mobile device 102 (e.g., a smart phone, a digital assistant, a tablet, or another sort of mobile computing device) and shopping cart 104 (e.g., a smart cart, a dolly cart, a shopping basket, or another sort of manually operated or self-guided physical device for conveying items, that includes various computing components and physical sensors) while shopping. The mobile device 102, for example, can communicate with the shopping cart 104 and with a server system 106 during the user's shopping trip. The server system 106, for example, can include and/or communicate with one or more computing servers (e.g., application servers, cloud servers, data servers, etc.). As described in further detail in examples below, communication between the various devices and systems may occur over a communication network and/or may occur over a direct connection.

During stage (A), a shopping cart is paired with a user's mobile computing device. For example, the system 100 can perform operation 130, pairing shopping cart 104 (shown here as cart 104*a*) with mobile device 102 (shown here as device 102*a*). Pairing the cart 104 with the mobile device 102, for example, can be initiated when the device 102 detects an identifier of the cart 104, which can be performed by the device 102 in a variety of ways. For example, the user of the mobile device 102 can select an option to scan a cart identifier (e.g., a barcode, a QR code, etc.) on the cart 104, using a mobile application running on the device 102, and can then capture an image of the cart identifier (e.g., using a device camera). As another example, the user of the mobile device 102 can select an option to wirelessly obtain the cart identifier, using the mobile application, and can then follow instructions presented by the mobile application regarding how to position the device 102 relative to the cart 104 to obtain the cart identifier wirelessly. In some implementations, wirelessly obtaining a cart identifier by a mobile computing device can include establishing a local wireless network between the device (e.g., mobile device 102) and a cart (e.g., cart 104). The local network, for example, can be any of a variety of communication networks between the mobile device 102 and the shopping cart 104, such as a WiFi Direct connection, a BLUETOOTH pairing (e.g., BLE pairing), an NFC connection, and/or connections to a common local wireless network (e.g., both the mobile device 102 and the cart 104 being connected to the same WiFi network). Other options for obtaining the cart identifier by the mobile device 102 are also possible. For example, the cart identifier can be obtained by establishing a wired connection between the mobile device 102 and the cart 104 (e.g., a tethered connection, such as a wired USB connection).

Once the cart identifier has been obtained, the mobile device 102 can transmit a cart association request to the server system 106 (e.g., through a WiFi network, or another suitable network of the retail environment 108). The cart association request, for example, can include the obtained cart identifier of the shopping cart 104, and can include information that uniquely identifies the mobile device 102. In response to receiving the cart association request, for example, the server system 106 can update cart data 112 in a cart data store 110 (e.g., a data server, a file system, or another suitable type of data storage device or system) to include data that associates the shopping cart 104 with the mobile device 102. In the present example, the cart data store 110 can include additional shopping cart specifications, such as a weight of a cart, and types of item verification sensors that may exist on the cart (e.g., infrared (IR) sensors, sound sensors, weight sensors, cameras, or other suitable sensors). Such additional information can be used by the system 100 to facilitate verification of items being added to the shopping carts and/or a final verification of cart contents, as described in further examples below.

During stage (B), items added to a shopping cart are verified. For example, the system 100 can perform operation 132, in which operations of the mobile device 102 (shown here as device 102*b*), the shopping cart 104 (shown here as cart 104*b*), and the server system 106 are coordinated to verify one or more items 150 as the items are added to the cart 104. A user can select one or more of the items 150 from its storage unit 152, for example, and can scan the item(s) with the mobile device 102, using a mobile application (e.g., a shopping application) running on the device 102. Item scanning, for example, can be performed by capturing an image of an identifier of a selected item (e.g., a barcode, a QR code, etc.) using a camera of the mobile device 104, by scanning a Radio Frequency Identification (RFID) tag of the selected item using an RFID scanner of the mobile device 104, or by performing another sort of item scan.

Once the item identifier has been obtained (and optionally, once an item quantity has been specified by the user), the mobile device 102 can transmit an item data request to the server system 106 (e.g., through a WiFi network, or another suitable network of the retail environment 108). The item data request, for example, can include the obtained item identifier of a selected item 150. In response to receiving the item data request, for example, the server system 106 can access an item data store 120 (e.g., a data server, a file system, or another suitable type of data storage device or system) that can include, in association with unique identifiers for various types of items (e.g., products in the retail environment 108), item data 122 for the items. The item data 122, for example, can include various types of item verification data for each item, each type of item verification data corresponding to a different type of item verification sensor that may exist on a shopping cart (e.g., infrared (IR) sensors, sound sensors, weight sensors, cameras, or other suitable sensors). In addition to the item verification data, for example, the item data 122 can include other item data in association with an item identifier, such as an item price, an item description, an item weight, an image of the item, one or more known locations of the item in the retail environment 108 according to a planogram and/or a heat map, etc. In the present example, the server system retrieves and provides item data 134 (e.g., including some or all of the item verification data and other item data that pertains to the selected item 150) to the mobile device 102 and/or the shopping cart 104, from the item data store 120.

In some implementations, retrieving and providing item verification data can be based at least in part on shopping cart specifications of a shopping cart that is paired with a mobile device that requested the data. For example, the item data request can include, along with the obtained item identifier of the selected item 150, an identifier of the shopping cart 104 that is paired with the mobile device 102, and/or an identifier of the device 102. Upon receiving the identifier of the shopping cart 104 and/or the identifier of the device 102, for example, the server system 106 can access the cart data store 110 and retrieve (and optionally, cache for later use) shopping cart specifications that correspond to the shopping cart 104. As another option, the mobile device 102 can provide the server system 106 with the shopping cart specifications that correspond to the paired shopping cart 104 as part of the item data request. After receiving the shopping cart specifications for the shopping cart 104 (e.g., including data that indicates each type of sensor that exists on the cart), for example, the server system 106 can retrieve and provide item verification data that corresponds to the selected item 150 and to the types of item verification sensors that exist on the cart 104. By retrieving and providing verification data that pertains to a particular cart, for example, an amount of data transmitted over the network(s) can be reduced, along with data transmission times.

In some implementations, retrieving and providing item verification data (and optionally, other item data) for an item can be performed without the item having been scanned. For example, the mobile device 102 can be associated with a user account that has a historical purchase history maintained by the server system 106. When the mobile device 102 and the shopping cart 104 are paired, for example, the server system 106 can retrieve and provide item verification data (and optionally, other item data) that pertains to a subset of the items 150 that have been frequently purchased by the user, based on the historical purchase history associated with the user's account. As another example, as the mobile device 102 moves throughout the retail environment 108, device location information (e.g., based on wireless signal strength data, Global Positioning System (GPS) data, or other suitable data) can be provided to the server system 106. In response to receiving the device location information, for example, the server system 106 can retrieve and provide item verification data (and optionally, other information) that pertains to a subset of the items 150 that are in proximity to the mobile device 102 (e.g., based on item location information maintained in the item data store 120).

By using the server system 106 to retrieve and provide verification data (and optionally, other item data) as the data is used (and/or, in anticipation of the data being used), data updates can be centrally managed. For example, the retail environment 108 may include tens of thousands of different types of items 150, and the relevant verification data and other product information for such items can change over time. When changes occur, for example, the item data store 120 and/or the cart data store 110 can be updated, and the mobile device 102 and/or the shopping cart 104 can receive current data for particular items upon request. Thus, the data storage requirements of both the mobile device 102 and the shopping cart 104 can be reduced, along with an amount of data transmitted over the network(s).

Once the item data 134 has been retrieved and provided by the server system 106, for example, the mobile device 102 and/or the shopping cart 104 can receive the data 134, and can use the data 134 to verify whether the item 150 scanned by the mobile device 102 is actually added to the cart 104, according to item verification sensors of the cart 104. In general, item verification data of a particular type can be used by item verification sensors of a corresponding type to verify an item. For example, infrared (IR) verification data (e.g., data that defines a size/shape of an item, as detected by IR sensors when the item enters the cart 104) can be used to verify the item 150 according to the shopping cart's IR sensors. Example techniques for verifying an item according to IR sensor data are described in U.S. Application No. 63/276,386, which is herein incorporated by reference. As another example, sound verification data (e.g., data that defines a sound that the item produces when placed in the cart 104, as detected by sound sensors) can be used to verify the item 150 according to the cart's sound sensors (e.g., one or more microphones). Example techniques for verifying an item according to sound sensor data are described in U.S. Application No. 63/276,462, which is herein incorporated by reference. As another example, weight verification data (e.g., data that defines a weight bump that the item generates when placed in the cart 104, as detected by weight sensors) can be used to verify the item 150 according to the cart's weight sensors (e.g., one or more scales). Example techniques for verifying an item according to weight sensor data are described in U.S. Application No. 63/276,474, which is herein incorporated by reference. Other types of item verification data and corresponding sensors are possible, and the various sensor types can be used singly or in combination with other sensors (and optionally, in combination with item location data) to verify scanned items. Item verification can include determining whether item verification data for a scanned item matches data collected by the corresponding sensors, as described in further detail in examples below.

In some implementations, item location data can be used to verify an item. For example, the item data 134 can include item location data 124 (e.g., including one or more item locations 126 according to a planogram and/or a heat map of past item scans by other mobile device users) for the item 150. As items are scanned by multiple different users in the retail environment 108, potentially through the use of multiple different applications (e.g., customers using a shopping application, employees using an inventory application, etc.), location data for each item scan can be determined (e.g., based on wireless signal strength data, Global Positioning System (GPS) data, or other suitable location data provided through use of a scanning device) and can be stored (e.g., by the item data store 120) for use in aggregating and providing the item location data 124. In general, location data for an item that has been collected within a certain period of time (e.g., the past day, the past week, the past month, or another suitable period of time) can be used for aggregating and providing item location data. If an item becomes available at a new location, for example, the new location can eventually be recognized as a valid location for the item, as the item is scanned at the new location by multiple different users over time. Item verification can include determining whether a location of a current scan of an item matches a determined item location 126 for the item according to its item location data 124 (e.g., the current scan location is within a threshold distance of five feet, ten feet, twenty feet, or another suitable threshold distance of the determined item location). When the location of the current item scan matches the determined item location 126 according to its item location data 124, for example, the scanned item can be verified with a higher level of confidence, whereas the scanned item may be unverified (or verified with a lower level of confidence) when the location of the current item scan does not match the determined item location. By considering the location of a current item scan relative to a determined item location according to its item location data when verifying an item, for example, deceptive practices (e.g., switching a high-cost item with a low-cost item having a similar physical profile) can be potentially be detected and prevented.

In some implementations, once an item has been successfully or unsuccessfully verified, a user can be notified through output generated by the mobile device 102 and/or the shopping cart 104. In the present example, the mobile device 102 (shown here as device 102*b*) can add the selected item (e.g., one of items 150) to a virtual shopping cart maintained by the device 102 and/or servers 106, which can be presented to the user at interface 160. As another example, the shopping cart 104 can provide an indication (e.g., visual, sonic, and/or tactile) of successful and/or unsuccessful item verification. Additional user notifications and interfaces are described in further detail in examples below.

In some implementations, a user may not be notified of an item being successfully or unsuccessfully verified. For example, item verification results can be maintained in association with a virtual shopping cart (e.g., with a scanned item being added to the cart, along with its verification status), without providing the item verification results to the user. By maintaining item verification results in the background in association with the user's virtual shopping cart, for example, a relatively uninterrupted shopping experience can be facilitated, while tracking the verification statuses of items that have been added to the cart. The verification statuses of each item in the virtual shopping cart can be aggregated, possibly with one or more other factors (e.g., a user's purchase history, a user's reputation score, etc.) to determine an overall verification status of the shopping cart 104. A high user reputation score, for example, can indicate a high level of virtual cart accuracy for the user for previous shopping trips (e.g., a virtual cart being shown to accurately represent the contents of a physical cart during checkout), whereas low reputation scores can indicate a low level of virtual cart accuracy for the user for previous shopping trips (e.g., a virtual cart being shown to not accurately represent the contents of a physical cart during checkout). The overall verification status of the shopping cart, for example, can be used as a factor in directing the user to an appropriate station during a checkout process.

During stage (C), a shopping cart may potentially be authorized for automated checkout. For example, the system 100 can perform operation 136, in which a determination of whether the user of the mobile device 102 (shown here as device 102*c*) and the shopping cart 104 (shown here as cart 104*c*) is authorized to proceed to an automated checkout station 170, or is to proceed to a manual checkout station 172. The automated checkout station 170, for example, can include RFID scanners, weight sensors, and/or high resolution cameras that can be used to determine whether the contents of the shopping cart 104, as tallied by the mobile device 102, correspond to what is being detected by the station 170. For example, the station 170 can measure the weight of the cart 104 and its contents, and determine whether the measured weight is within a threshold of the expected weight of the cart 170 and its contents, according to the mobile device tally. As another example, the station can use its RFID scanners to verify items with RFID tags that automated device sensors (e.g., IR scanners) are unable to verify with confidence. As another example, the station can use its cameras to capture one or more images of the cart 104 and its contents. If the cart 104 is validated across one or more of these signals, the customer may be automatically charged for the tallied contents and permitted to simply depart the retail environment 108. The manual checkout station 172, for example, can be a Point of Sale (POS) terminal at which items are removed from the shopping cart 104, an employee of the retail environment 108 individually scans the items to tally a total price, and the user provides a payment before departing the environment 108.

In general, determining whether a shopping cart is authorized for automated checkout can include determining a cart accuracy score for a virtual shopping cart, from verification results associated with items that have been placed in the shopping cart. Determining the cart accuracy score used for cart authorization, for example, can be based on a quantity of items in the cart (e.g., an absolute quantity, a percentage quantity, etc.) that have been verified, and/or an aggregated confidence score (e.g., averaged and/or weighted) for items in the cart, as described in further examples below. In some implementations, one or more additional authorization factors (e.g., a user's purchase history, a user's reputation score, etc.) can be considered when determining whether a shopping cart is authorized for automated checkout. For example, if a user is a regular customer of a store, and/or is a user of one or more additional services provided by the store (e.g., credit services, loyalty services, etc.), and/or has a high reputation score, a lower cart accuracy score may qualify the user for an automated checkout-whereas if the user is not a regular customer, and/or is not a user of additional services, and/or has a low reputation score, a higher cart accuracy may qualify the user for the automated checkout. In the present example, the shopping cart 104 is authorized for automated checkout (e.g., the virtual cart's accuracy score meets a threshold value), and the user is notified through output generated by the mobile device 102, which can be presented to the user at interface 162. At stage ($D_1$), for example, the user can proceed with the mobile device 102 and the shopping cart 104 to the automated checkout station 170 to perform an automated checkout operation 138. However, if the shopping cart 104 were not to be authorized for automated checkout (e.g., the virtual cart's accuracy score does not meet a threshold value), the user would be notified through output generated by the mobile device 102, and at stage ($D_2$), for example, the user could proceed with the mobile device 102 and the shopping cart 104 to the manual checkout station 172 to perform a manual checkout operation 140.

In some implementations, an additional item check may be performed after an automated checkout operation. For example, after the automated checkout operation 138 is performed on the shopping cart 104 (at stage ($D_1$)), the user can be presented with further instructions (e.g., through output presented by the mobile device 102, through an indicator on the shopping cart 104, and/or through output presented by the automated checkout station 170) for completing the shopping trip. If the automated checkout station 170 confirms that the user's virtual shopping cart accurately represents the contents of the physical shopping cart 104, for example, the user's transaction can be finalized and the user can be permitted to depart the retail environment 108. If the automated checkout station 170 is unable to confirm that the user's virtual shopping cart accurately represents the contents of the physical shopping cart 104 within a threshold level of certainty, for example, an employee of the retail environment 108 can be directed to perform an additional item verification (e.g., by scanning one or more random items, high value items, and/or specifically unverified items in the shopping cart 104). If the shopping cart 104 passes the additional item verification, for example, the user's transaction can be finalized and the user can be permitted to depart the retail environment 108. If, however, the shopping cart 104 does not pass the additional item verification, for example, the user can be directed to the manual checkout station 172 to perform the manual checkout operation 140. Similarly, if the automated checkout station 170 determines that the user's virtual shopping cart does not accurately represent the contents of the physical shopping cart 104 (e.g., one or more items were detected by the automated checkout station 170 as being in the shopping cart 104 that are not in the user's virtual shopping cart), the user can be directed to the manual checkout station 172 to perform the manual checkout operation 140.

In some implementations, upon completion of a shopping trip, a user's transaction may be automatically finalized and the user may be permitted to depart without first proceeding to an automated checkout station or a manual checkout station. For example, if a virtual cart's accuracy score meets a threshold value and one or more additional authorization factors pertain to the user (e.g., the user's reputation score meets a threshold value and/or the user subscribes to a loyalty program and/or uses credit services of the store), the user can be provided with a notification (e.g., on the mobile device 102 and/or the shopping cart 104) to confirm the transaction. After the user's transaction for the shopping trip is finalized, for example, the user can be permitted to simply depart the store. Example techniques for determining whether a shopping cart is authorized for automated checkout and verifying items by an automated checkout system are described in U.S. Application No. 63/276,471, which is herein incorporated by reference.

Figure 2:
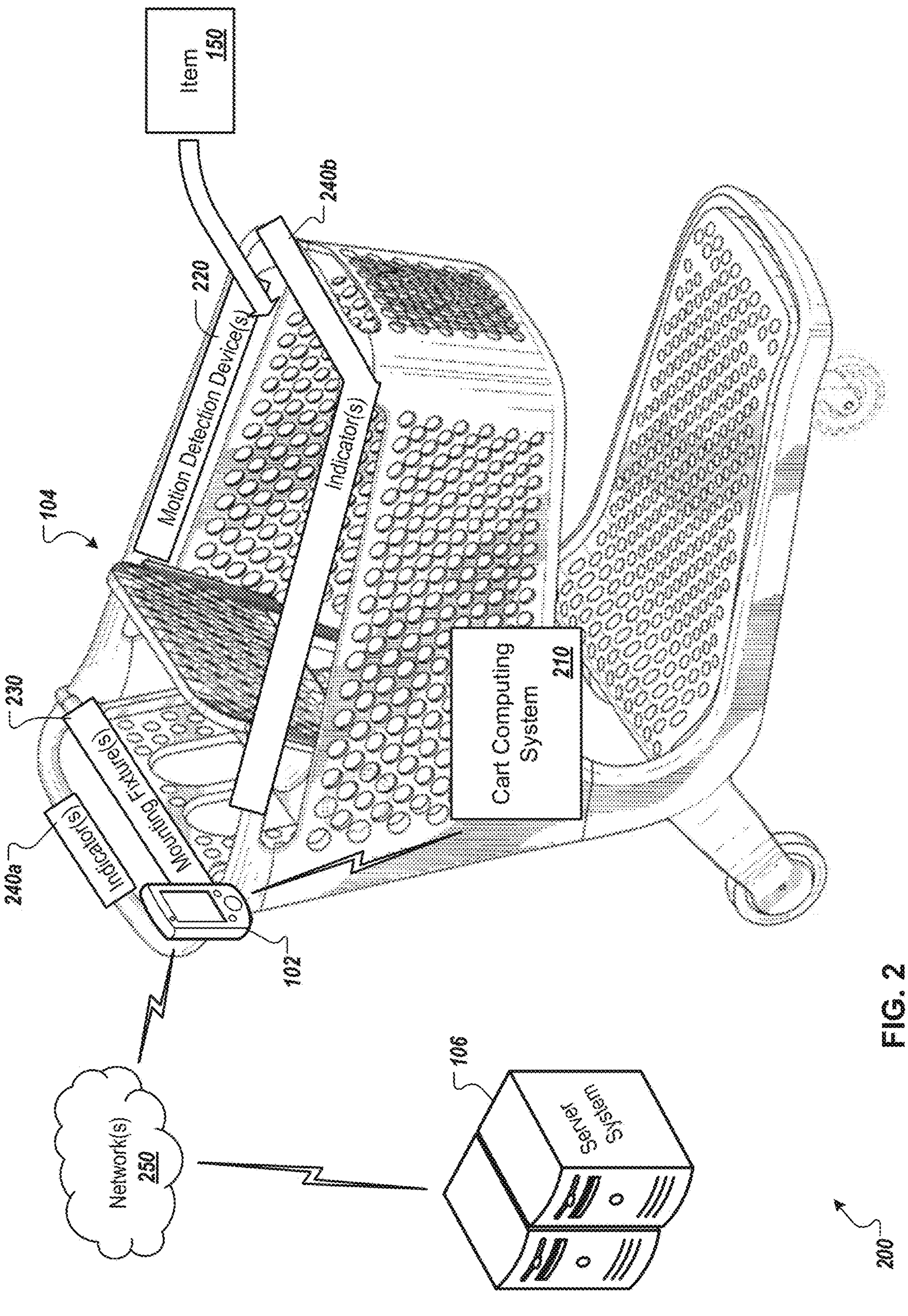
FIG. 2 depicts an example system for verifying items placed in physical shopping carts.

FIG. 2 depicts an example system 200 for verifying items placed in physical shopping carts. The system 200, for example, can include mobile device 102 (shown in FIG. 1), shopping cart 104 (also shown in FIG. 1), and server system 106 (also shown in FIG. 1), in communication over network(s) 250. The network(s) 250, for example, can include one or more communication networks, including a LAN (local area network), a WAN (wide area network), and/or the Internet. In addition to or instead of communicating over network(s) 250, in some implementations, devices, carts, and/or servers may communicate directly using an appropriate communications protocol (WiFi, BLUETOOTH low energy (BLE), near-field communication (NFC), etc.). For example, the mobile device 102 can perform a wireless pairing operation (e.g., WiFi Direct pairing, BLUETOOTH low energy (BLE) pairing, near-field communication (NFC) pairing) with the a cart computing system 210 of the shopping cart 104 to establish an association with the cart 104.

As shown in FIG. 2, the cart 104 can be a smart cart. In some implementations, the cart 104 can be a preexisting shopping cart in the retail environment 108 that has been modified/updated to include one or more components used for performing the item verification techniques described herein. Since the components used for item verification may be low cost, modifying existing shopping carts with the components can be simple and inexpensive relative to producing new carts.

The shopping cart 104 can include optional mounting fixture(s) 230 (e.g., on or near a cart handle), optional indicator(s) 240*a-b* (e.g., on or near the cart handle and/or around a top perimeter of the cart), the cart computing system 210, and motion detection device(s) 220. The mounting fixture(s) 230 can have a housing or other configuration that can removably receive the mobile device 102 (e.g., smart phone, digital assistant, tablet, etc.) of a user. The housing or other configuration can be sized to fit mobile devices of varying sizes. The mounting fixture(s) 230 can also be located at one or more other regions of the cart 104 to facilitate ease of access, attachment, and removal of the mobile device 102 from the cart 104.

Figure 3:
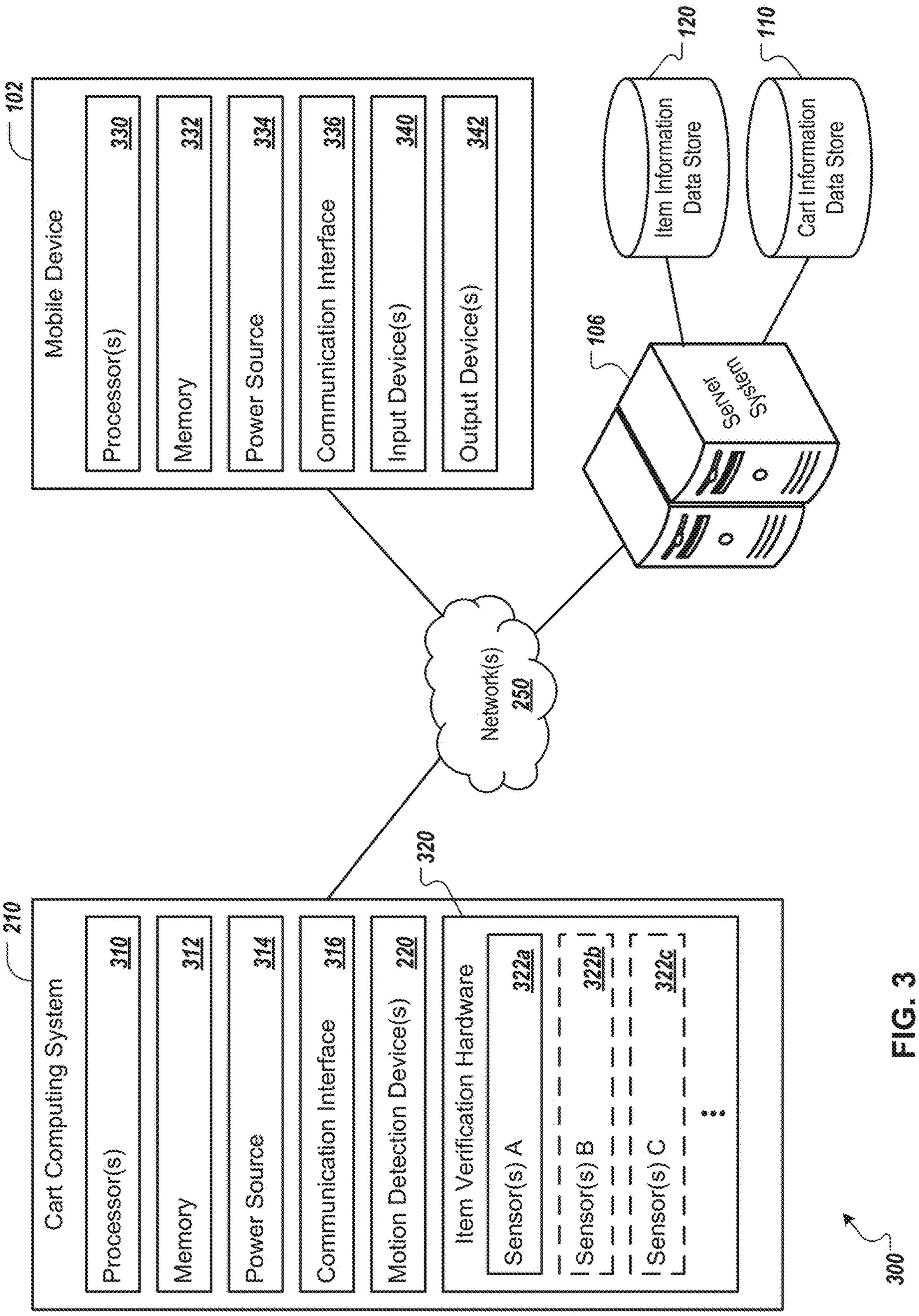
FIG. 3 depicts an example system for verifying items placed in physical shopping carts.

The cart computing system 210, as described further in reference to FIG. 3, can include processor(s), memory, a power source, and a communication interface. In addition, the cart computing system 210 can be in communication (e.g., wired, wireless) with the mobile device 102, and can include and/or be in communication with the motion detection device(s) 220 and/or the indicator(s) 240*a-b*. In some implementations, in addition to providing power to the cart computing system 210, the power source of the cart computing system 210 can provide power to one or more additional components of the shopping cart 104, including but not limited to the motion detection device(s) 220 and/or the indicator(s) 240*a-b*. In some implementations, the power source can also provide power to the mobile device 102 (e.g., to charge the device 102) while the device 102 is mounted at the mounting fixture(s) 230.

The motion detection device(s) 220, for example, can include one or more sensors along the top perimeter of the shopping cart 104 (e.g., directed toward an interior of the cart), and can be configured to detect motion indicative of an item (e.g., item 150) being placed in or removed from the cart 104. In some implementations, the motion detection device(s) 220 of the shopping cart 104 and/or the cart computing system 220 can include one or more optical sensors (e.g., infrared (IR) sensors) that are sufficiently spaced to detect and track vertical and rotational motion of the item 150 as it passes through a horizontal plane defined by the top perimeter of the cart 104. The optical sensors, for example, can be configured to translate movement and velocity of items entering or leaving the cart 104, in a z-dimension.

The indicator(s) 240*a-b*, for example, can include one or more output devices (e.g., indicator lights, speakers, tactile devices, etc.) on or near the handle of the shopping cart 104 and/or around a top perimeter of the cart (e.g., a ring of upward-facing indicator lights). In general, the indicator(s) 240*a-b* can be configured to convey verification status information that pertains to an addition of an item to the cart 104, and/or an overall state of the cart. In some implementations, the indicator(s) 240*a-b* can be configured to provide verification status information to a user of the shopping cart 104 instead of, or in addition to, verification status information provided by the mobile device 102. For example, the indicator(s) 240*a-b* can include a first indicator that indicates a successful item verification (e.g., a green light, a chime tone, etc.), and can include a second indicator that indicates an unsuccessful item verification (e.g., a red light, a buzzer tone, etc.). In some implementations, the indicator(s) 240*a*-*b* can be configured to provide information that indicates an overall state of the shopping cart 104. For example, the indicator(s) 240*a*-*b* can include different indicators (e.g., different colored lights, different light intensities, and/or different flashing light patterns) that indicate whether the cart 104 is active, is inactive, is malfunctioning, is waiting for an item to be added, has detected that an item has been added (e.g., either with or without an indication of whether the item has been successfully or unsuccessfully verified), and/or other suitable cart states. As another example, the indicator(s) 240*a*-*b* can include different indicators for directing a user during a checkout process. For example, the indicator(s) 240*a*-*b* can include a first indicator (e.g., a green light) that indicates that a transaction is complete and that a customer may leave the store, a second indicator (e.g., a yellow light) that indicates that a user is to proceed to a station where a partial check of the cart contents is performed (e.g., by an employee), and a third indicator (e.g., a red light) that indicates that a user is to proceed to a manual checkout station where the entire cart contents are determined and the transaction is completed. In some implementations, the indicator(s) 240*a*-*b* can be an LED light bar and/or an LED light strip. One or more other light configurations can be used for the indicator(s) 240*a*-*b*.

FIG. 3 depicts an example system 300 for verifying items placed in physical shopping carts. The system 300, for example, can include cart computing system 210 (also shown in FIG. 2), mobile device 102 (also shown in FIG. 1 and FIG. 2), and server system 106 (also shown in FIG. 1 and FIG. 2), in communication over one or more network(s) 250. The cart computing system 210, for example, can be part of a shopping cart, such as the shopping cart 104 (shown in FIG. 1 and FIG. 2). In some implementations, the cart computing system 210 can include one or more components that are separate from a shopping cart and/or in communication with one or more components of the shopping cart (e.g., a cloud-based system and/or service). In such a scenario, the cart computing system 210 can, for example, perform operations for multiple shopping carts. The cart computing system 210 can include processor(s) 310, memory 312, a power source 314, a communication interface 316, motion detection device(s) 220 (also shown in FIG. 2), and item verification hardware 320. The processor(s) 310 can be configured to execute one or more of the processes/techniques described herein.

The cart computing system 210 can be configured to activate the item verification hardware 320 in response to identification of the item by the mobile device 102 (e.g., through a scan of the item, a captured image of the item, etc.) and/or when an item is detected as entering the shopping cart 104. For example, the motion detection device(s) 220 can provide a notification of when the item enters the shopping cart to the cart computing system 210, which can then activate one or more sensors 322*a*-*c* of the item verification hardware 320. The motion detection device(s) 220, for example, can include one or more sensors attached to the shopping cart 104, to collect information about an item as it passes through a top horizontal plane of the cart and enters the cart. For example, the motion detection device(s) 220 can include IR emitters, IR sensors, and IR optical flow sensors. The IR emitters and IR sensors can be alternating in a single line along a top perimeter of the shopping cart 104, for example, while the IR optical flow sensors can be interspersed along the single line at the top perimeter of the shopping cart 104 at predetermined distances/intervals. The IR emitters can be activated to generate light across the top horizontal plane of the shopping cart 104 as the item passes through the plane and into the cart. The generated light can be detected by the IR sensors as IR data, which can be used to determine when an item enters and/or exits the shopping cart 104, for example, and/or to generate a shadow map of the item.

In some implementations, data from the motion detection device(s) 220 can be used to determine a velocity of an item as it enters a shopping cart. As the item moves through the top horizontal plane and into the shopping cart 104, for example, the IR optical flow sensors can detect rotational and/or motion data of the item, which can be used to determine velocity of the item as it moves into the cart. Because of variable distances between the IR optical flow sensors and the item, a relative translation rate or other data received from the IR optical flow sensors may not directly translate into velocity of the item. In some implementations, trigonometric functions can be used to determine relative item and IR optical flow sensor positioning over time. For example, a curve can be generated that indicates a position of the item over time as the item passes through the top horizontal plane of the shopping cart 104. The curve, for example, can also be a map of time values corresponding to a constant change in item position, for example. A velocity of the item can be identified using the curve, for example.

The item verification hardware 320, for example, can include one or more sensors (e.g., sensors 322*a*-*c*) that can be used to detect an item that is placed in (or removed from) the shopping cart 104, to measure various physical properties of the detected item, and to provide item data based on the measurements. For example, each of the sensor(s) 322*a*-*c* can be a different type of sensor that measures a different physical property, such as one or more IR sensors (e.g., sensors of the motion detection device(s) 220 and/or similar sensors) for measuring a size/shape of an item, one or more sound sensors (e.g., microphones) for measuring a sound produced by the item, one or more weight sensors (e.g., scales) for measuring a weight bump produced by the item, one or more cameras for visually recognizing the item, or other suitable sensors. The item verification hardware 320, for example, can include a single type of sensor, or can include a combination of multiple different sensor types. In some implementations, data from the motion detection device(s) 220 can be used to perform item verification. For example, sensors of the motion detection device(s) 220 can be sensors of the item verification hardware 320 (e.g., any of the sensors 322*a*-*c*). For example, data from the motion detection device(s) 220 (e.g., IR sensor data) can be used to reconstruct an item in multidimensional (e.g., 3D) space to determine a size/shape of the item.

The mobile device 102, for example, can be a smart phone, digital assistant, tablet, or other sort of mobile computing device. Functionality described herein can be presented in a mobile application or other software suite presented at the mobile device 102. The mobile device 102 can be used to scan items that a customer desires to purchase, and can be used by the customer to apply offers, promotions, and/or coupons to their transaction. A virtual shopping cart can be accessible at the mobile device 102 and can include various items that the customer scans with the mobile device 102 and puts in their shopping cart 104. In some implementations, the virtual shopping cart can also include virtual products that the customer selects from an online shopping application presented at the mobile device 102.

The mobile device 102 can include processor(s) 330, memory 332, a power source 334, a communication interface 336, input device(s) 340, and output device(s) 342. The processor(s) 330 can be configured to execute one or more of the processes/techniques described herein. The input device(s) 340 can include one or more of a touch screen display, keyboard, mouse, microphone, and/or imaging sensors, and can receive user input. For example, a user can scan an identifier on packaging of an item using a camera (e.g., one of the input device(s) 340) of the mobile device 102. As another example, the user can use a Radio Frequency Identification (RFID) scanner (e.g., another of the input device(s) 340) of the mobile device 102 to scan an RFID tag of the item. The user can also provide input indicating an item quantity on a touch screen display of the mobile device 102, for example. The output device(s) 342 can include display screens, speakers, and/or other types of devices for delivering content/information to a user. For example, the output device(s) 342 can present information in graphical user interface (GUI) displays at the mobile device 102. The output device(s) 342, for example, can be an LCD touch screen that can present an application or software suite that allows a user to scan items, add items to their virtual shopping cart, access account information, review transactions, and/or complete transactions. The output device(s) 342 can also provide notifications, messages, and/or alerts to the user indicating whether an item is verified. The output device(s) 342 can provide one or more other forms of output to the user, as described herein.

The server system 106 can include one or more computing servers (e.g., application servers, cloud servers, data servers, etc.). For example, the server system 106 can communicate with, and can store, update, and retrieve data in the cart data store 110 and the item data store 120. The cart data store 110, for example, can maintain information associated with various shopping carts in the retail environment 108 (e.g., cart identifiers, current pairings with mobile devices, cart specifications, etc.). The item data store 120, for example, can maintain information associated with various items in the retail environment 108 (e.g., item identifiers, verification data associated with the items, item prices, item descriptions, item weights, item images, item locations, available item quantities, etc.).

Figure 4A:
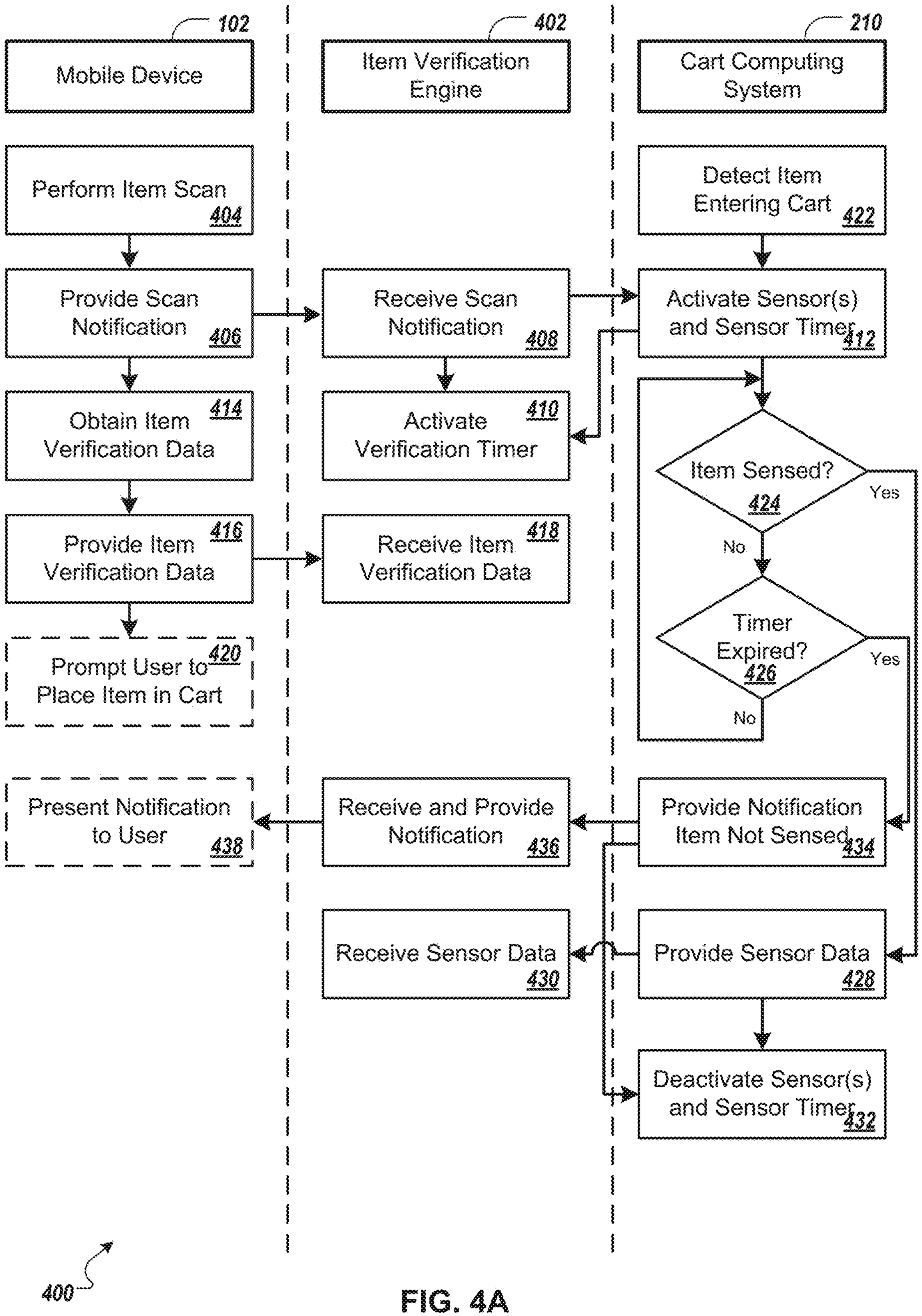
FIGS. 4A-B comprise a flow diagram of an example technique for verifying items placed in physical shopping carts.
Figure 4B:
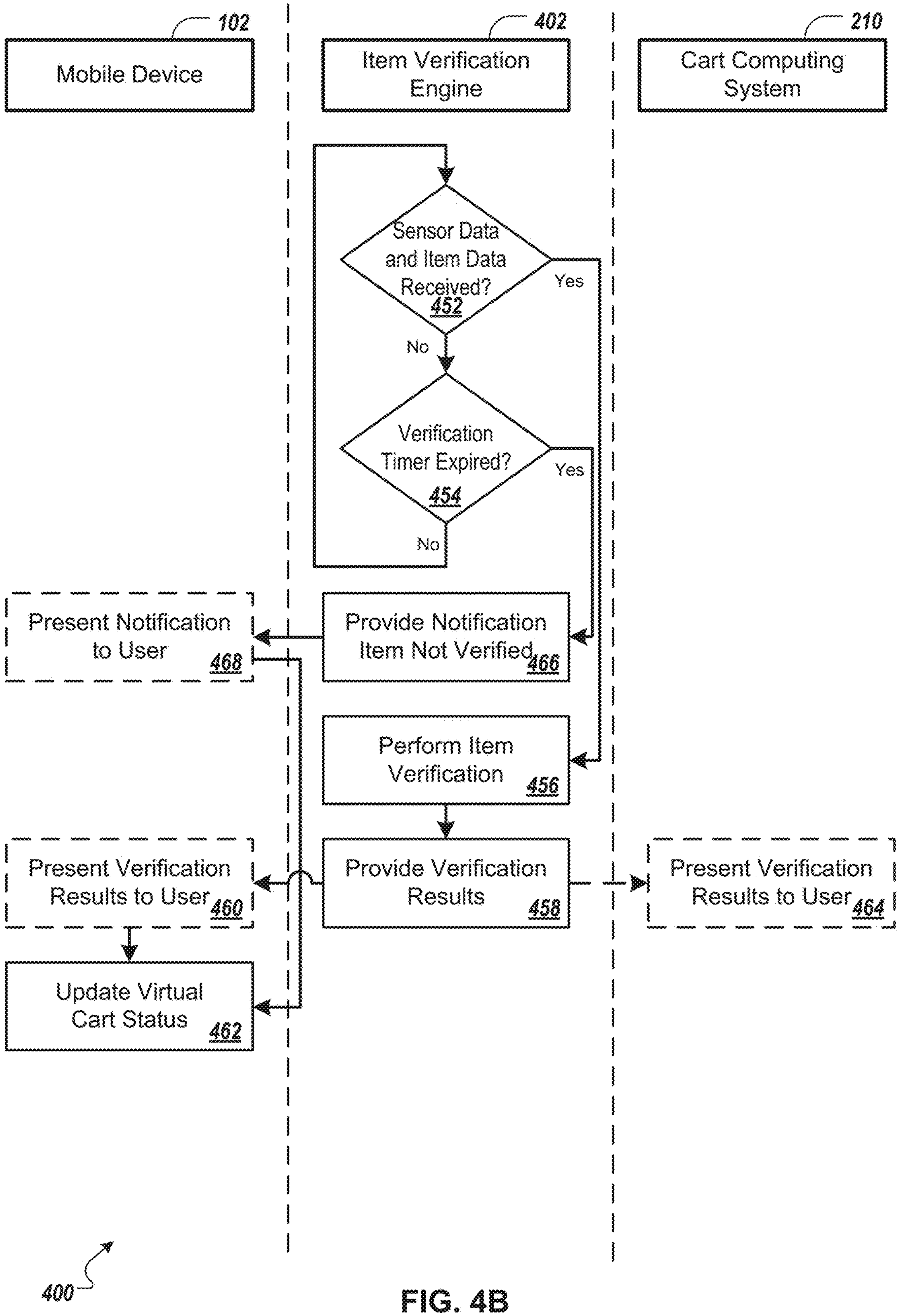

FIGS. 4A-B comprise a flow diagram of an example technique 400 for verifying items placed in physical shopping carts. The example technique 400, for example, includes coordinated operations of a mobile device (e.g., mobile device 102, also shown in FIGS. 1-3) and a cart computing system (e.g., cart computing system 210, also shown in FIG. 2 and FIG. 3). In the present example, some operations of the example technique 400 are described with reference to an item verification engine 402, which can be executed by the mobile device 102 or the cart computing system 210. Optionally, the item verification engine 402 may be executed by the server system 106, with the mobile device 102 forwarding sensor data from the cart computing system 210 to the server system 106, and with the server system directly obtaining item verification data from the item data store 120 and not providing the item verification data to the mobile device 102. In general, the example technique 400 is not a linear process, in that operations may be triggered in response to item scans performed by the mobile device 102 and/or by sensor readings by the cart computing system 210. Also, since item verification data may be retrieved by the server system 106 and provided to the mobile device 102 and/or cart computing system 210 in response to an item scan, for use in verifying an item placed in the shopping cart 104, the item verification data may or may not be available to the verification engine 402 before sensor data is available. For example, a user may scan an item using the mobile device 102, then place the item in the shopping cart 104 before or after the verification data for the item happens to arrive from the server system 106. To provide a smoother shopping experience for the user, for example, various data caching techniques and timer activation techniques can be employed to handle data transmission variances, such that the user is not inconvenienced by a strictly linear process (e.g., a process in which an item is to be placed in a cart only when item verification data is available).

In a regular scenario, the mobile device 102 is used to perform an item scan at 404. Referring to FIG. 1, for example, a user of the mobile device 102 can select an item 150 from the storage unit 152, and can scan the item 150 with the device 102. Optionally, the device 102 can provide a user interface control through which a user can specify a quantity of items to be added to the shopping cart 104. After performing the item scan (and optionally receiving an item quantity specified by the user), for example, the mobile device 102 can provide a scan notification (at 406) to the item verification engine 402 and to the cart computing system 210. At 408, the item verification engine 402 (e.g., executed by the cart computing system 210 or the mobile device 102) can receive the scan notification. In response to receiving the scan notification, for example, at 410, the item verification engine 402 can activate a verification timer (e.g., 5 seconds, 10 seconds, 20 seconds, or another suitable period of time) during which the engine 402 waits for item verification data and sensor data to be received. Further, in response to receiving the scan notification from the mobile device 102, for example, at 412 the cart computing system can activate its various sensors (e.g., the item verification hardware 320, shown in FIG. 3), and can activate a sensor timer (e.g., 5 seconds, 10 seconds, 20 seconds, or another suitable period of time) during which the cart computing system 210 waits for sensor data to be received, as a result of the item 150 being placed in the shopping cart 104. For implementations in which the cart computing system 210 executes the item verification engine 402, for example, the verification timer and the sensor timer can be the same timer.

According to the regular scenario described above, verification/sensor timers are activated in response to an item scan by a mobile device. However, in an alternate scenario, a user may place an item in a shopping cart without scanning the item, or after performing an unsuccessful scan. To account for such scenarios, for example, the cart computing system 210 can detect an item entering a shopping cart at 422. In response to the cart computing system 210 detecting the item, for example, the cart computing system 210 can activate its various sensors and its sensor timer at 412, and the item verification engine 402 can activate its verification timer at 410. In the present example, to detect the item 150 entering the shopping cart 104, cart computing system 210 can receive data from motion detection device(s) 220 (shown in FIG. 2 and FIG. 3). With both the verification timer and the sensor timer being activated (or a single combined timer in the case of the cart computing system 210 executing the item verification engine), for example, potential problems or uncommon scenarios can be appropriately handled.

By activating a shopping cart's item verification hardware (e.g., including one or more types of sensors) in response to an item scan notification provided by a mobile device and/or when an item is detected as entering the cart, battery power consumed by the item verification hardware can be conserved. For example, some sensors may consume a little power (or no power) while in an inactive mode, and a greater amount of power while actively performing a sensing operation. Further, by activating one or more sensors immediately prior to a time when the sensor(s) are likely to be used and by activating a limited sensor timer, for example, data collected by the sensors can be limited to a time period corresponding to the sensor. Thus, a relatively small amount of sensor data may be cached at any time while potentially waiting for item verification data to be available.

Returning now to the regular scenario, for example, while the verification timer and the sensor timer (or the single combined timer) are activated, the mobile device 102 can obtain item verification data at 414. For example, the mobile device 102 can transmit, to the server system 106, an item data request that includes the item identifier of the item 150, determined from the scan of the item 150. In response to receiving the item data request, for example, the server system 106 can access the item data store 120 (shown in FIG. 1), can retrieve item verification data (and optionally, other item data, such as item price, description, weight, image, etc.) that corresponds to the item identifier in the item data request, and can provide the item verification data (and optionally, other item data) to the mobile device 102. As another example, the mobile device 102 can access cached item verification data (and optionally, other item data) that was received from the server system 106 before the item 150 was scanned. At 416, the mobile device 102 can provide the item verification data received from the server system 106 to the item verification engine 402, and the item verification engine 402 can receive the item verification data at 418. Optionally, at 420, the mobile device 102 can prompt the user to place the item 150 in the cart 104. For example, the mobile device 102 can provide a visual and/or audible message to the user through a mobile application running on the device 102.

While the item verification hardware 320 of the cart computing system 210 is activated and the sensor timer is running, for example, the user can place item 150 in the shopping cart 104. At 424, one or more sensors of the item verification hardware 320 can sense the item 150 being placed in the shopping cart 104 by the user. In response to the item 150 being sensed, for example, the cart computing system 210 can provide the sensor data associated with the item 150 to the item verification engine 402 (at 428), and the cart computing system 210 can deactivate the sensors of the item verification hardware 320 (at 432). At 430, for example, the item verification engine 402 can receive the sensor data from the cart computing system 210, and may proceed to verify the item 150 (as shown in FIG. 5B).

In an alternate scenario, the sensor timer may expire (at 426), before an item is sensed. For example, the user may scan an item and not place the item in the shopping cart 104. As another example, the item may be detected as beginning to enter the shopping cart 104 (e.g., the motion detection device(s) 220 may be triggered), but the user may not actually place the item in the cart 104. As another example, one or more sensor devices 322*a-c* of the item verification hardware 320 may malfunction. In such scenarios, for example, the cart computing system 210 can provide a notification (at 434) to the item verification engine 402 that an item was not sensed, and can deactivate the sensors of the item verification hardware 320 (at 432). At 436, for example, the item verification engine 402 can receive the notification that the item was not sensed, and can provide the notification to the mobile device 102. At 438, for example, the mobile device 102 can optionally present an appropriate message to the user based on the notification and/or a current scenario. For example, if an item was detected as entering the shopping cart 104 and the item was not scanned and not sensed, instructions can be provided to the user to scan the item and place the item in the cart. As another example, if the item was scanned and the item was not sensed, a message can be provided to the user to place the item in the shopping cart 104.

Referring now to FIG. 4B, for example, the example technique 400 for verifying items placed in physical shopping carts can continue. In the regular scenario, the item verification engine 402 has received item verification data (at 418), and has received sensor data (at 430). In the present example, the item verification engine 402 can determine (at 452) that the item verification data and the sensor data has been received, can proceed to perform verification of the item (at 456), and can verify that a count of items as indicated by the received sensor data corresponds to a quantity of items specified as being placed in the cart by a user, to determine verification results (e.g., a successful verification of the item 150 based on the item's verification data and the received sensor and/or item location data, or an unsuccessful verification). (Item verification is described in further detail below with reference to FIG. 5.) At 458, for example, the item verification engine 402 can provide verification results to the mobile device 102, and optionally, to the cart computing system 210. At 460, for example, the mobile device 102 can receive the verification results and can optionally present the verification results to the user. For example, the mobile device 102 can present the verification results through a mobile application running on the device 102. At 462, the mobile device 102 can update a virtual cart status. For example, the mobile device 102 can add data representing a scanned and verified item (e.g., an item identifier, an item price, an item description, an item weight, an item image, an item quantity, an item verification confidence value, and/or other appropriate item data) to a virtual cart maintained by a mobile application running on the device 102. As another example, the mobile device 102 can add data representing a scanned and unverified item to the virtual shopping cart (e.g., along with data that indicates that the item is unverified, such as the item's verification confidence value being under a threshold value for the item). At 464, for example, the cart computing system 210 can optionally present verification results to the user. For example, cart computing system 210 can cause the indicator(s) 240*a-b* to provide information indicative of the verification results (e.g., green light for successful item verification, red light for unsuccessful verification, or another suitable visual, audible, or tactile indicator).

In an alternate scenario, the verification timer may expire (at 454), before item verification data is received. For example, the user may scan an item and place the item in the shopping cart 104, however the verification engine 402 does not receive item verification data for the scanned item before the verification timer expires. In such a scenario, the item verification engine 402, for example, can provide a notification (at 466) that the item is not verified to the mobile device 102. At 468, for example, the mobile device 102 can optionally present an appropriate message to the user based on the notification and/or current scenario. For example, the mobile device 102 can present, through a mobile application running on the mobile device 102, a message that the system was unable to verify the item and/or that potential network issues exist. At 462, the mobile device 102 can update a virtual cart status. For example, the mobile device 102 can add data representing the scanned item to a virtual cart maintained by a mobile application running on the device 102.

Although the present scenarios are primarily directed to the verification of items being added to a physical shopping cart and the updating of a corresponding virtual shopping cart, in some implementations, users may have the option of indicating items to be removed from the physical shopping cart. For example, a user can select an item from a virtual cart presented by a mobile application running on the mobile device 102, and indicate through the application that the item is to be removed from the physical cart. The cart sensors can provide sensor data that results from removal of the item from the physical cart, for example, and the item verification engine 402 can verify whether the item has been actually been removed. After an item has been removed from the physical cart, for example, the item can also be removed from the virtual cart. If an item removal is not successfully verified, for example, a virtual cart's overall accuracy score may be decreased, whereas a successfully verified item removal may have a neutral impact on the accuracy score (other than removing the item's individual verification confidence value from an overall accuracy score for the cart).

Figure 5:
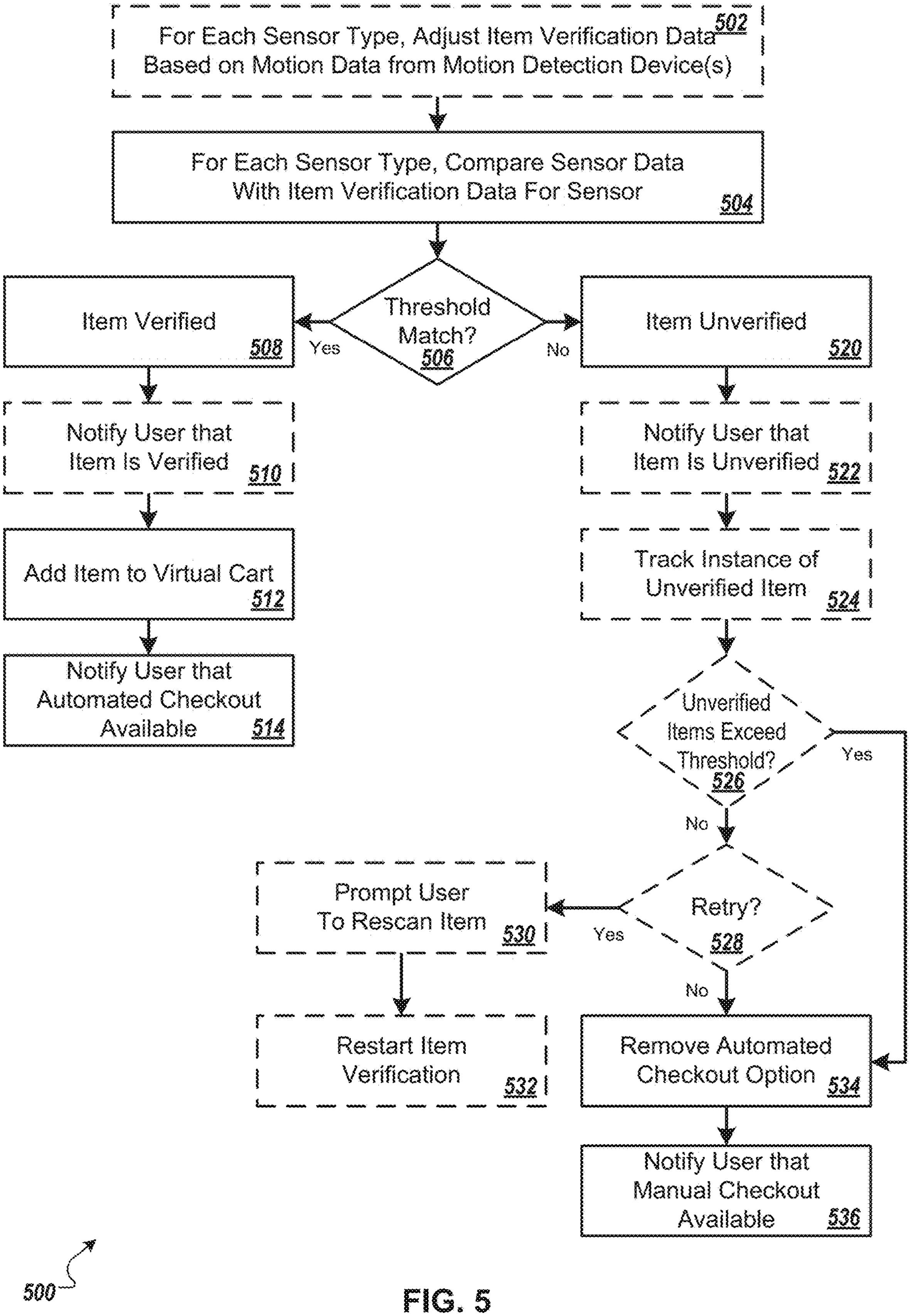
FIG. 5 depicts an example process flow for determining a verification status of an item, and presenting a notification to a user based on the verification status.

FIG. 5 depicts an example process flow 500 for determining a verification status of an item, and presenting a notification to a user based on the verification status. Some operations of the example process flow 500 (e.g., adjusting sensor data based on motion data, comparing sensor data with item verification data, and determining whether an item is verified) may be performed by the item verification engine 402 (shown in FIGS. 4A-B), which may be executed by the mobile device 102 or the cart computing system 210 (or optionally, the server system 106). Some operations of the example process flow 500 (e.g., providing notifications/prompts to users, tracking unverified items, managing a virtual cart, and managing an automated checkout option) may be performed by the mobile device 102, or a combination of the mobile device 102 and the server system 106 (e.g., with a cloud-based mobile application running on the mobile device 102).

At 502, for each type of sensor on the shopping cart 104, item verification data may optionally be adjusted, based on motion data from the motion detection device(s) 202. For example, after receiving item verification data for a scanned item, and receiving sensor data from one or more sensors 322*a-c* (shown in FIG. 3), the verification engine 402 can use the motion data to adjust the sensor data from each of the one or more sensors 322*a-c*. The motion data, for example, can indicate a velocity of the item 150 as it enters the shopping cart 104, whereas the item verification data can be associated with a baseline velocity (e.g., an average velocity of the item 150 being added to carts when pre-generating the item verification data for the item). If the velocity of the item 150 being added to the shopping cart 104 is greater than or less than the baseline velocity associated with its item verification data, for example, the verification engine 402 can proportionally adjust the item verification data for the item 150 and the sensor type, according to the increase or decrease in velocity. For item verification data for a sound sensor, for example, the item verification engine 142 can increase the amplitude of a sound sample in the item verification data when the item's velocity is greater than the baseline velocity, or can decrease the amplitude of the sound sample when the item's velocity is less than the baseline velocity. As another example, for item verification for a weight sensor, the item verification engine 142 can increase an expected weight bump in the item verification data when the item's velocity is greater than the baseline velocity, or can decrease the expected weight bump when the item's velocity is less than the baseline velocity. Alternately, the item verification engine 142 can adjust the sensor data for each type of sensor, based on the motion data—for example, decreasing values of the sensor data when item's velocity is greater than the baseline velocity, or increasing values of the sensor data when the item's velocity is less than the baseline velocity.

At 504, for each sensor type, the received (and optionally adjusted) sensor data can be compared with the received (and optionally adjusted) item verification data for that sensor. For example, the item verification engine 402 can compare the IR sensor data associated with item 150 being placed in the shopping cart 104, with the IR verification data for the item (e.g., comparing a sensed shadow profile with an expected shadow profile for the item). As another example, the item verification engine 402 can compare the sound sensor data associated with item 150 being placed in the shopping cart 104, with the sound verification data for the item (e.g., comparing a sound sample captured by a cart's microphone(s) with an expected sound sample for the item). As another example, the item verification engine 404 can compare the weight sensor data associated with item 150 being placed in the shopping cart 104, with the weight verification data for the item (e.g., comparing a weight bump detected by a cart's scale(s) with an expected weight bump for the item). The item verification engine 402, for example, may compare sensor data with item verification data for a single sensor type, or may compare data for two or more sensor types and combine the comparison results.

At 506, the item verification engine 402 can determine whether there is a threshold match, for each sensor type, between the received (and optionally adjusted) sensor data and the received (and optionally adjusted) item verification data for that sensor. For example, the item verification engine 402 can determine whether a sensed shadow profile for the item 150 matches the expected shadow profile for the item within a threshold margin (e.g., a sufficiently similar size and shape). As another example, the item verification engine 402 can determine whether a sound sample captured by a cart's microphone(s) matches the expected sound sample for the item within a threshold margin (e.g., a sufficiently similar wave form). As another example, the item verification engine 402 can determine whether a weight bump detected by a cart's scale(s) matches the expected weight bump for the item within a threshold margin (e.g., a sensed weight bump value within a threshold range of the expected weight bump). As another example, the item verification engine 402 can determine whether a scanned location for the item is within a threshold distance of the item's determined location according to its item location data. The item verification engine 402, example, may determine whether a threshold match exists for a single sensor type, or may determine whether threshold matches exist for two or more sensor types (and/or according to item location data) and combine the determination results. For example, when multiple different sensor types (and optional item location data) are used to verify an item, the verification results as determined by each individual verification technique can be aggregated, to generate a composite verification result. In some implementations, a verification result can include a confidence score (e.g., a percentage value) that indicates a likelihood of an item that has been scanned being the same item that has been placed in the cart. A high verification confidence score, for example, can indicate that that a scanned item was likely placed in the cart, whereas a low verification confidence score can indicate that an item that is different from the scanned item may have been placed in the cart. In addition, the item verification engine 402, for example, can determine whether a count of items as indicated by the sensor data corresponds to a quantity of items specified by a user as being placed in the cart (e.g., by performing multiple matches of sensor data and item verification data).

In addition to or instead of the aforementioned techniques for optionally adjusting item verification data, comparing sensor data with item verification data, and determining whether there is a threshold match (e.g., as described with respect to boxes 502, 504, and 506), in some implementations, determining a match between sensor data (and optionally, scanned item location data) and item verification data can include various machine learning techniques. For example, the received sensor data from one or more sensors 322*a-c*, the received motion data, and the optional scanned item location data can be provided by the verification engine 402 to one or more pre-trained machine learning algorithms (e.g., classification algorithms) that can generate a verification confidence score for the item 150. In some implementations, the motion data and the received sensor data for each sensor type can be individually provided to a corresponding algorithm for the sensor type to generate a verification confidence score according to the sensor type, and the various verification confidence scores can be aggregated to determine an overall verification confidence score for the item. For example, the motion data and the received sensor data from an IR sensor can be provided to an IR sensor classification algorithm to generate an IR verification confidence score, the motion data and the received sensor data from a sound sensor can be provided to a sound sensor classification algorithm to generate a sound verification confidence score, and the motion data and the received sensor data from a weight sensor can be provided to a weight sensor classification algorithm to generate a weight verification confidence score. Optionally, the location of an item scan and the item's location data can be provided to a location classification algorithm to generate a location verification confidence score. In the present example, the IR verification confidence score, the sound verification confidence score, and the weight verification confidence score (and optionally, the location verification confidence score) can be aggregated (e.g., weighted, averaged, etc.) to generate an overall verification confidence score for the item 150. In some implementations, the motion data and the received sensor data for each sensor type can be provided to a composite algorithm that has been pre-trained based on data from multiple different sensor types (and optionally, location data). For example, the motion data and the received sensor data from the IR sensor, the sound sensor, and the weight sensor (and optionally, the location of the item scan) can be provided to a composite classification algorithm to generate an overall verification confidence score for the item 150.

If the item verification engine 402 determines that there is a threshold match between the sensor data and the item verification data for the item 150, for example, the engine 402 can provide a notification to the mobile device 102 that the item is verified (at 508). The notification, for example, can include a binary verification result (e.g., verified or unverified), and/or a verification confidence score (e.g., a confidence percentage). In response to the notification, for example, the mobile device 102 can optionally notify the user that the item 150 is verified (at 510). For example, the mobile device 102 can provide a visual and/or audible message to the user through a mobile application running on the device 102. At 512, for example, the mobile device 102 and/or the server system 106 can add the item 150 to the user's virtual shopping cart. For example, the mobile device 102 and/or the server system 106 can maintain a tally of items that have been scanned by the user (and optionally, also verified by the system 100) during a current shopping trip. At 514, for example, the mobile device 102 can notify the user that an automated checkout option is available to the user, for when the user chooses to end the current shopping trip.

Figure 7A:
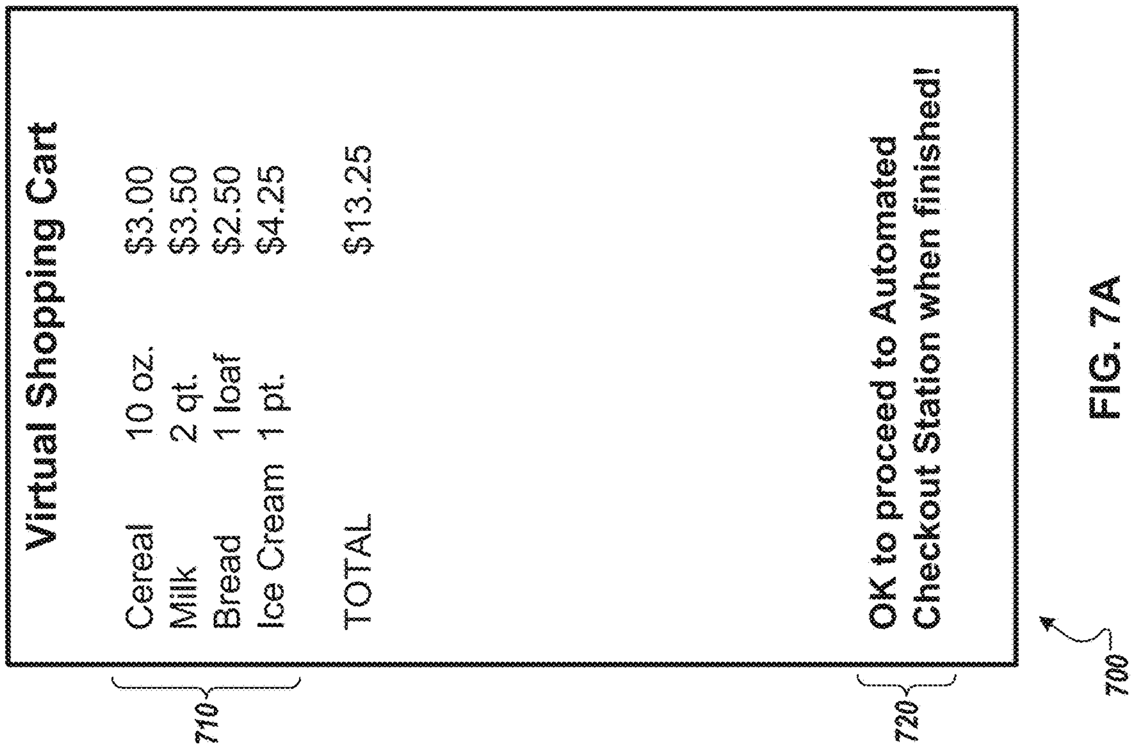
FIGS. 7A-B depict example interfaces for notifying users of items in a virtual shopping cart and available checkout options.

Referring to FIG. 7A, an example interface 700 is shown that can notify a user of items in a virtual shopping cart, checkout options available to the user, and/or verification statuses of items added to a physical shopping cart. For example, the mobile device 102 can present the interface 700 through a mobile application, which can be executed by the device 102 and/or the server system 106 (e.g., as a cloud-based application). In the present example, the interface 700 includes a list of items 710 that have been scanned by the user (e.g., using the mobile device 102), have been verified by the system 100, and added to the user's virtual shopping cart. The list of items 710 can include, for each item in the list, various sorts of data associated with the item, such as a description, price, image, quantity, weight, and/or other item data. In some implementations, some of the item data may be presented to the user (e.g., through the interface 700), whereas other item data may be maintained in the background. For example, the computing device 102 and/or the server system 106 can maintain an expected weight of each item in the list of items 710, for use in verifying the shopping cart 104 during an automated checkout process (e.g., weighing the cart 104 and its contents by the automated checkout station 170, and comparing an expected weight to an actual weight). In the present example, the interface 700 can present a total price of items in the virtual shopping cart, and can present a notification 720 (e.g., a message) to the user that the user may proceed to an automated checkout station when finished with the shopping trip.

Figure 8A:
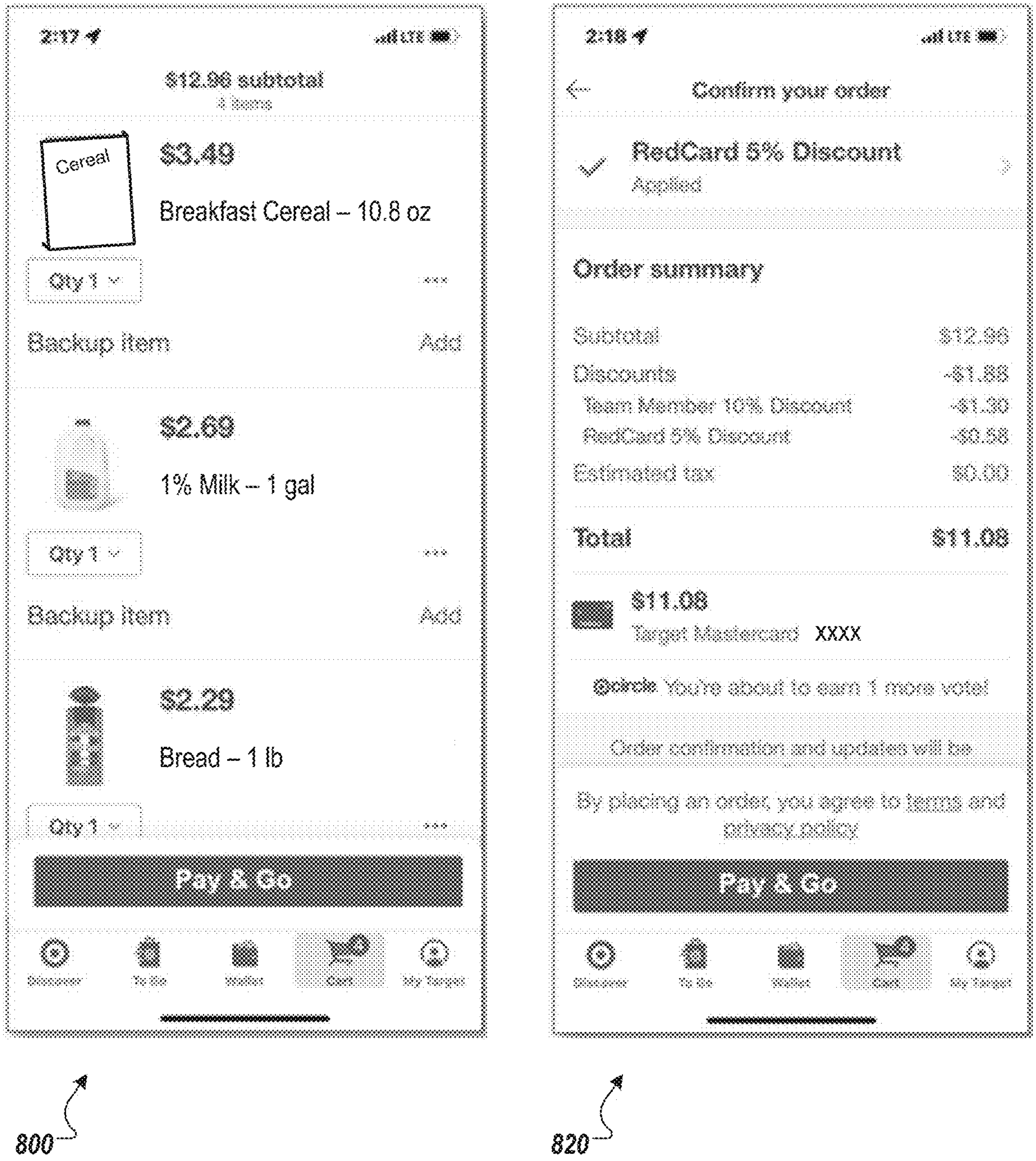
FIGS. 8A-B depict example interfaces for notifying users of items in a virtual shopping cart and available checkout options.

Referring to FIG. 8A, example interfaces 800, 820 are shown that can notify users of items in a virtual shopping cart and available checkout options. For example, the mobile device 102 can present the interfaces 800, 820 through a mobile application, which can be executed by the device 102 and/or the server system 106 (e.g., as a cloud-based application). In the present example, the interface 800 presents information (e.g., description, price, image, quantity, weight, etc.) associated with items that have been scanned by the user (e.g., using the mobile device 102), have been verified by the system 100 (e.g., with each item having been assigned a corresponding verification confidence score), and added to the user's virtual shopping cart. The interface 820, for example, facilitates completing a transaction for the user's shopping trip, including presenting an order summary that includes a subtotal, possible discounts, estimated tax, and a total charge for the shopping trip, along with information related to a selected payment method. Each of the interfaces 800, 820 in the present example can present a notification (e.g., a "Pay & Go" message) to inform the user that the current shopping trip qualifies for an automated checkout option.

Referring again to FIG. 5, if the item verification engine 402 determines that there is not a threshold match between the sensor data and the item verification data for the item 150, for example, the engine 402 can provide a notification to the mobile device 102 that the item is not verified (at 520).

In response to the notification, for example, the mobile device 102 can optionally notify the user that the item 150 is not verified (at 522), or that a count of items as indicated by the sensor data does not correspond to an item quantity specified by the user. For example, the mobile device 102 can provide a visual and/or audible message to the user through a mobile application running on the device 102.

Optionally, the mobile device 102 can track instances of unverified items, and/or provide an option for the user to retry verifying an item (or to correct a specified item quantity). For example, at 524, the mobile device 102 and/or server system 106 can track an instance of an unverified item (e.g., by adding data representing the item 150 to a list of unverified items). At 526, for example, the mobile device 102 and/or server system 106 can determine whether the unverified items exceeds a threshold. The threshold, for example, can be an absolute threshold (e.g., a number of items in a list of unverified items), a price threshold (e.g., a dollar value of items in the list of unverified items), a percentage threshold (e.g., a percentage of items in the list of unverified items relative to a number of scanned items), or another sort of threshold. If the unverified items do not exceed the threshold, for example, the user can optionally be given the option to retry verification of the item 150 (at 528). If the option to retry item verification is available (and/or if the user chooses the option), the user can be prompted to rescan the item 150 and/or correct the item quantity (at 530), and the item verification process can be restarted (at 532). For example, the mobile device 102 can prompt the user to rescan the item 150 through a mobile application running on the device 102. If the option to retry item verification is unavailable (and/or if the user does not choose the option), or if the unverified items exceeds the threshold (at 526), the automated checkout option can be removed (at 534). For example, the mobile device 102 and/or the server system 106 can maintain data that indicates the user's virtual shopping cart includes one or more unverified items during a current shopping trip. At 536, for example, the mobile device 102 can notify the user that a manual checkout option is available to the user, for when the user chooses to end the current shopping trip.

Figure 7B:
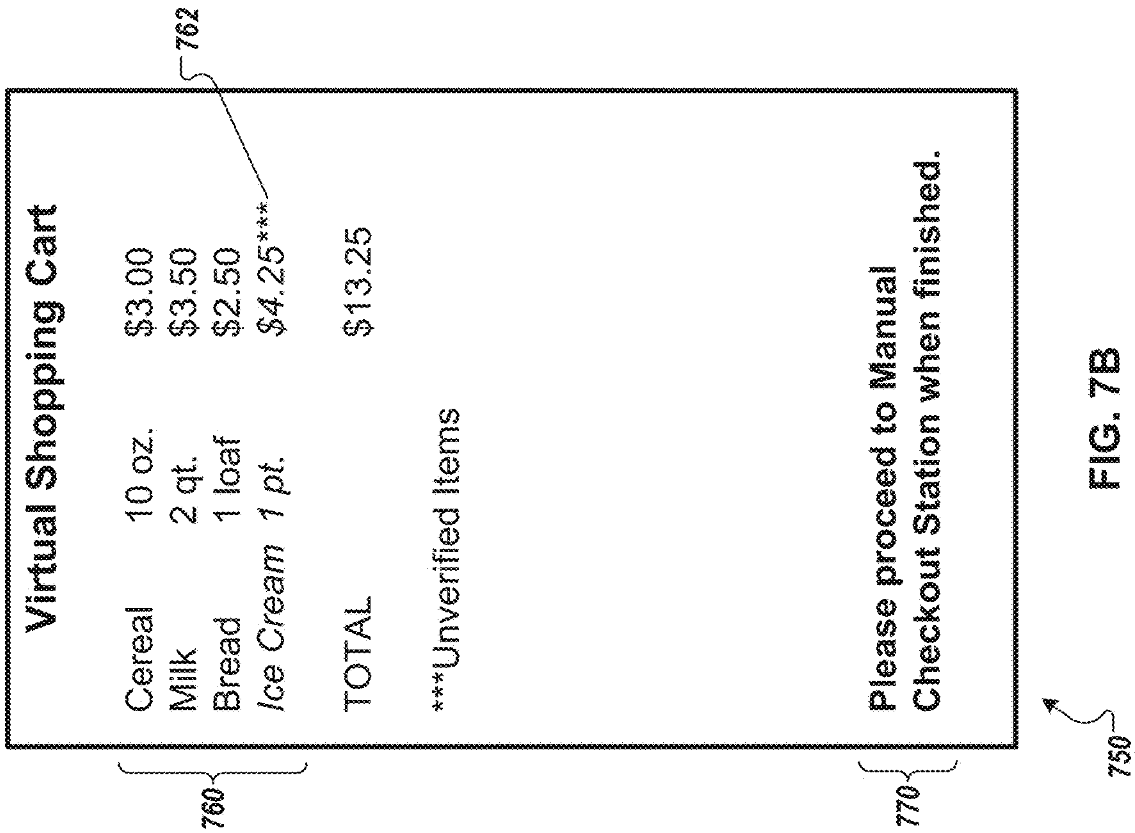

Referring to FIG. 7B, an example interface 750 is shown that can notify a user of items in a virtual shopping cart, verification statuses of the items, and/or checkout options available to the user. For example, the mobile device 102 can present the interface 750 through a mobile application, which can be executed by the device 102 and/or the server system 106 (e.g., as a cloud-based application). In the present example, the interface 750 includes a list of items 760 that have been scanned by the user (e.g., using the mobile device 102), however not all of the items have been verified by the system 100. Unverified items, for example, can be marked with a visual indication 762 (e.g., a graphical indicator, a note, a color, a font, etc.) that indicates that the items have not been verified. As another example, unverified items can be maintained in a separate list from verified items. As another example, information about whether an item has been verified or unverified can be maintained in the background and not presented to a user. In the present example, the interface 750 can present a notification 770 (e.g., a message) that the user may proceed to a manual checkout station when finished with the shopping trip.

Figure 8B:
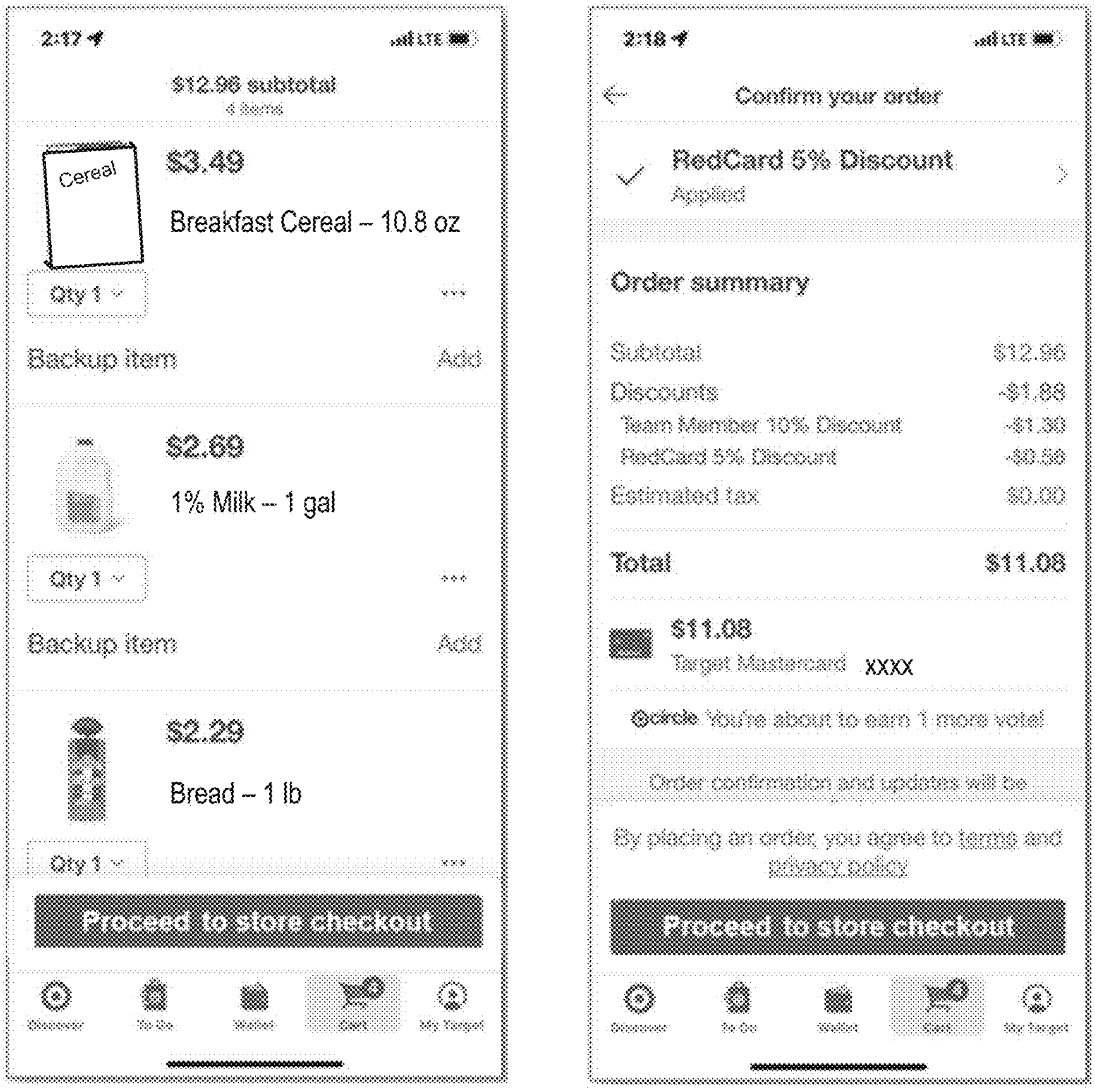

Referring to FIG. 8B, example interfaces 840, 860 are shown that can notify users of items in a virtual shopping cart and available checkout options. For example, the mobile device 102 can present the interfaces 840, 860 through a mobile application, which can be executed by the device 102 and/or the server system 106 (e.g., as a cloud-based application). In the present example, the interface 840 presents information (e.g., description, price, image, quantity, weight, etc.) associated with items that have been scanned by the user (e.g., using the mobile device 102), that have been verified by the system 100 (e.g., with each item having been assigned a corresponding verification confidence score), and added to the user's virtual shopping cart. In the present example, verification confidence information for each item is not directly surfaced to the user, in that some items may have a relatively high verification confidence score, whereas other items may have a relatively low verification confidence score. An overall cart accuracy score (e.g., based on aggregating the individual item verification confidence scores, and optionally based on other factors, such as a user's purchase history, a user's reputation score, and other suitable factors) can be maintained in the background, for example, can be continually updated as the user adds and/or removes items from the physical shopping cart, and can be used to provide appropriate instructions to the user for finalizing a transaction for the current shopping trip. The interface 860, for example, facilitates completing a transaction for the user's shopping trip, including presenting an order summary total charge for the shopping trip, along with information related to a selected payment method. Each of the interfaces 840, 860 in the present example, can present a notification (e.g., a "Proceed to store checkout" message) to inform the user that the current shopping trip does not qualify for an automated checkout option, and that the user is to proceed to a manual checkout station instead.

As described in examples above, verifying items placed in physical shopping carts may not be a linear process, in that various operations may be triggered in response to item scans performed by mobile devices (e.g., mobile device 102) and/or sensor readings by shopping carts (e.g., including cart computing system 210). Also, since item verification data may be provided by server systems (e.g., server system 106) as the data is to be used by a shopping cart and/or mobile device, for example, the item verification data may or may not be available to the item verification engine 402 (shown in FIGS. 4A-B, and executed by the mobile device 102 or the cart computing system 210) before the sensor data is available. Thus, caching techniques may be used to cache one sort of data (e.g., the sensor data or the item verification data) until the other sort of data is available, or until a timer expires. As described in further detail in examples below, the system 100 can handle various scenarios in which one type of data or the other does not arrive before the timer expires.

Figure 6A:
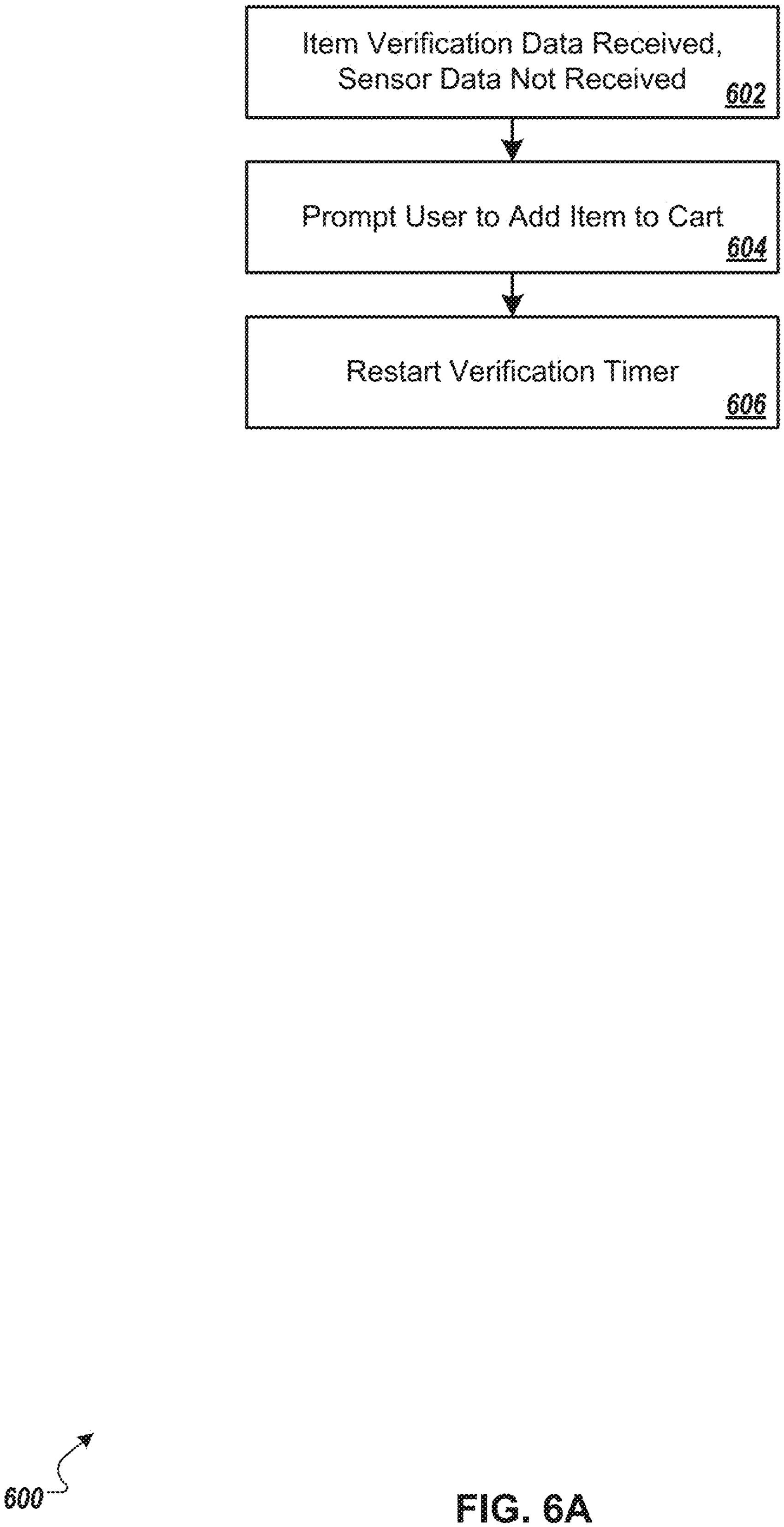
FIG. 6A depicts an example process flow for handling a scenario of item verification data being received, and sensor data not being received.

FIG. 6A depicts an example process flow 600 for handling a scenario of item verification data being received, and sensor data not being received. At 602, for example, the item verification engine 402 can determine that item verification data that corresponds to a scan of the item 150 by the mobile device 102 has been received, however sensor data has not been received from one or more item sensors 322*a-c* before a sensor timer (or a combined sensor/verification timer) has expired. In the present example, it is possible that the user may not have placed the item 150 in the shopping cart 104 after scanning the item. Thus, the mobile device 102 can prompt the user to add the item 150 to the shopping cart 104 (at 604), and at 606, the device 102 can provide a notification to the verification engine 402 to restart the verification timer (or combined timer).

Figure 6B:
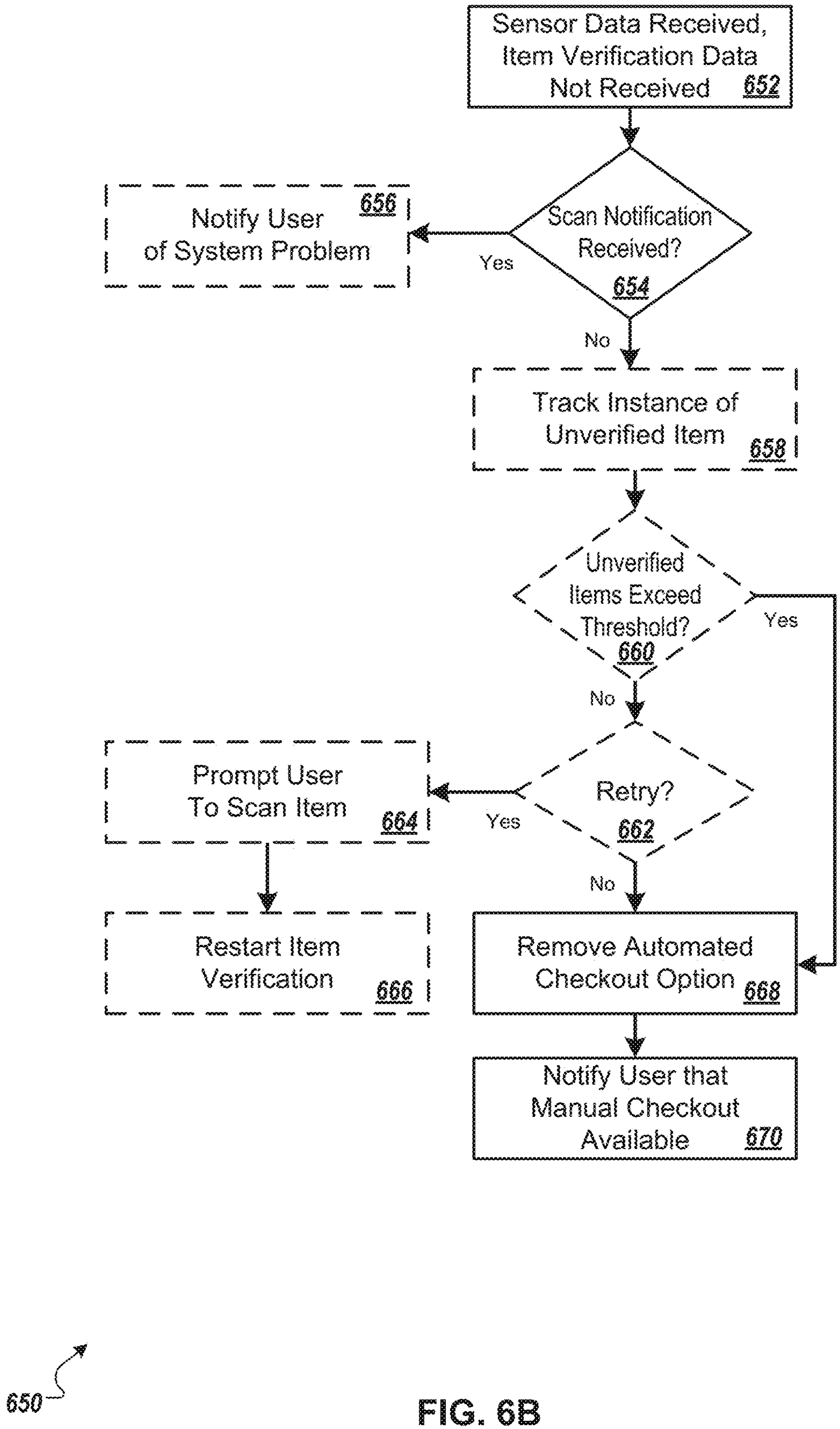
FIG. 6B depicts an example process flow for handling a scenario of sensor data being received, and item verification data not being received.

FIG. 6B depicts an example process flow 650 for handling a scenario of sensor data being received, and item verification data not being received. At 652, for example, the item verification engine 402 can determine that sensor data that corresponds to the item 150 being placed in the shopping cart 104 has been received, however item verification data that corresponds to a scan of the item 150 by the mobile device 102 has not been received before a verification timer (or a combined verification/sensor timer) has expired. At 654, for example, the verification engine 402 can determine whether a scan notification has been received. For example, the user may or may not have scanned item 150, with the item scan resulting in the scan notification. If the scan notification has been received, for example, the mobile device 102 (e.g., through a mobile application) can optionally notify the user of a system problem at 656. For example, the server system 106 and/or a communication network between the server system 106 and the mobile device 102 may be experiencing technical problems, and may be temporarily unable to retrieve and/or provide item verification data for a scanned item.

If the scan notification has not been received, however, the cause of the sensor data having been received (and the item verification data not being received) may be the result of the item 150 having been placed in the shopping cart 104 without being scanned by the mobile device 102. In the present example, the process flow 650 may optionally include operations for tracking instances of unverified items, and/or enabling the user to retry verifying an item (e.g., similar to operations described with reference to FIG. 5). For example, at 658, the mobile device 102 and/or server system 106 can track an instance of an unverified item. At 660, for example, the mobile device 102 and/or server system 106 can determine whether the unverified items exceeds a threshold. If the unverified items do not exceed the threshold, for example, the user can optionally be giving the option to retry verification of the item 150 (at 662). If the option to retry item verification is available (and/or if the user chooses the option), the user can be prompted to rescan the item 150 (at 664), and the item verification process can be restarted (at 666). If the option to retry item verification is unavailable (and/or if the user does not choose the option), or if the unverified items exceeds the threshold (at 660), the automated checkout option can be removed (at 668). At 670, for example, the mobile device can notify the user (e.g., through interface 750, shown in FIG. 7B) that a manual checkout option is available to the user when the user chooses to end the current shopping trip.

Figure 9:
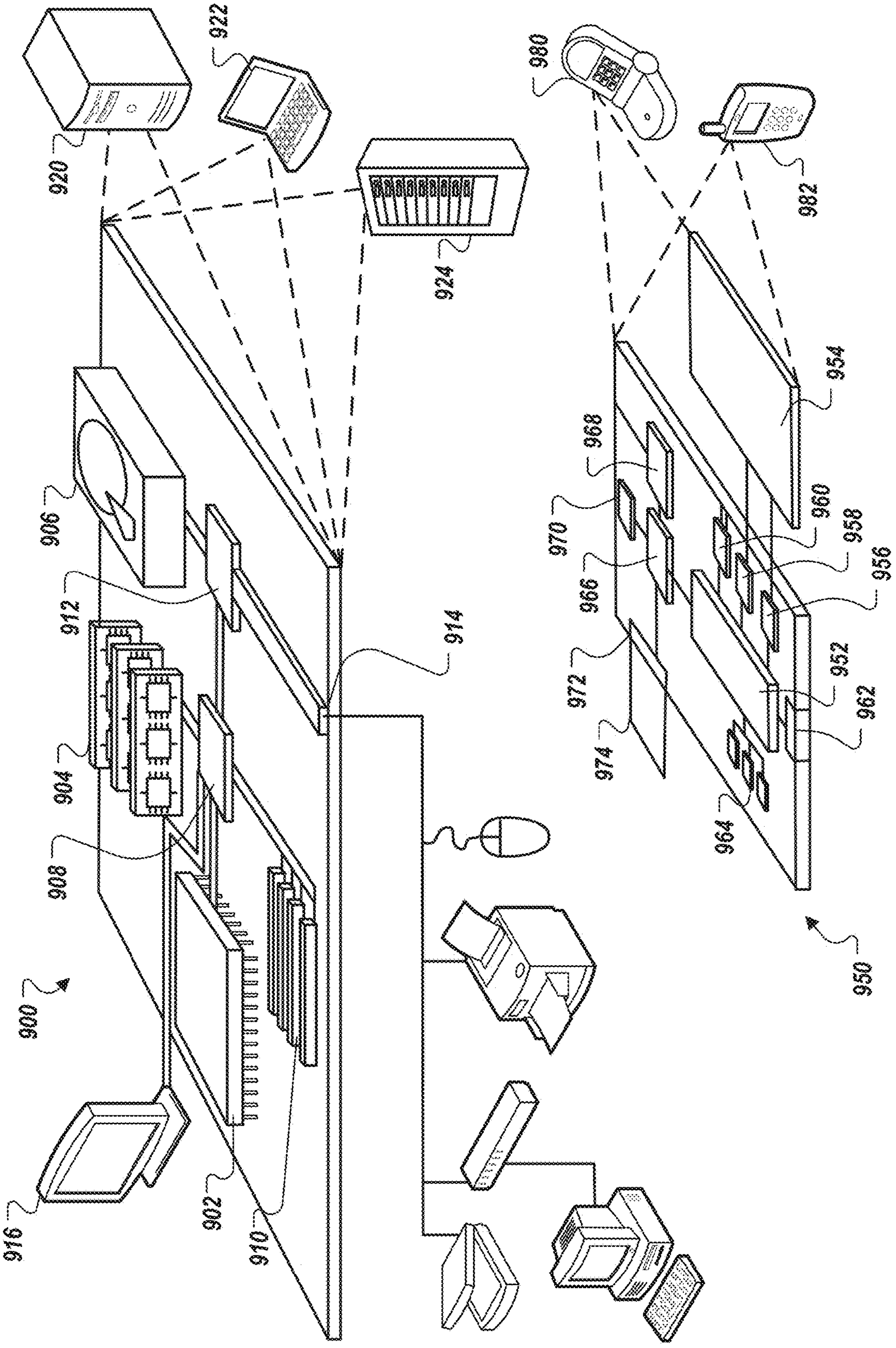
FIG. 9 is a schematic diagram that shows an example of a computing device and a mobile computing device.

FIG. 9 shows an example of a computing device 900 and an example of a mobile computing device that can be used to implement the techniques described here. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. For example, the memory 904 is a volatile memory unit or units. For example, the memory 904 is a non-volatile memory unit or units. The memory 904 can also be another form of computer-readable medium, such as a magnetic or optical disk.

The storage device 906 is capable of providing mass storage for the computing device 900. For example, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. For example, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device, such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication For example, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also. Thus, for example, the expansion memory 974 can be provide as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. For example, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. For example, the computer program product can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980. It can also be implemented as part of a smart-phone 982, personal digital assistant, or other similar mobile device.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method comprising:

scanning an item, by a mobile computing device;

in response to scanning the item, providing, by the mobile computing device to a server system over a wireless network, a request for item verification data for verifying the item scanned by the mobile computing device, wherein the request for item verification data comprises an item identifier of the item scanned by the mobile computing device;

receiving, by the mobile computing device from the server system over the wireless network, the item verification data for verifying the item scanned by the mobile computing device, wherein the item verification data comprises item verification data corresponding to each of one or more item sensors of a shopping cart that is separate from the mobile computing device;

receiving, by the mobile computing device and from a cart computing system of the shopping cart that is separate from the mobile computing device, over a local wireless connection between the mobile computing device and the cart computing system of the shopping cart, sensor data that is collected by one or more item sensors of the shopping cart as a result of the item having been placed in the shopping cart;

performing, by the mobile computing device, a verification of the item based on the sensor data and the item verification data; and presenting, by the mobile computing device, verification results based on performing the verification of the item.

2. The computer-implemented method of claim 1, further comprising:

obtaining, by the mobile computing device, a cart identifier of the shopping cart;

wherein the request for item verification data comprises the cart identifier of the shopping cart.

3. The computer-implemented method of claim 1, further comprising:

in response to scanning the item, providing, by the mobile computing device to the cart computing system, instructions for the cart computing system to activate the one or more sensors of the shopping cart.

4. The computer-implemented method of claim 1, further comprising:

in response to scanning the item, starting, by the mobile computing device, a verification timer during which the mobile computing device waits for the sensor data and the item verification data to be received.

5. The computer-implemented method of claim 4, wherein the verification of the item is performed when the sensor data and the item verification data is received before the verification timer expires.

6. The computer-implemented method of claim 4, further comprising:

in response to determining that the verification timer has expired before receiving the sensor data, (i) presenting, by the mobile computing device, a prompt to add the item to the shopping cart, and (ii) restarting, by the mobile computing device, the verification timer.

7. The computer-implemented method of claim 1, wherein performing the verification of the item based on the sensor data and the item verification data comprises determining whether there is a threshold match between the sensor data and the item verification data, for each type of sensor that exists on the shopping cart.

8. The computer-implemented method of claim 7, wherein determining whether there is a threshold match between the sensor data and the item verification data comprises providing, for each type of sensor that exists on the shopping cart, the sensor data for the sensor type to a corresponding algorithm for the sensor type to generate a verification confidence score according to the sensor type, and aggregating the verification confidence scores to determine an overall verification confidence score for the item.

9. The computer-implemented method of claim 7, wherein presenting the verification results comprises presenting, by the mobile computing device, a notification that an automated checkout option is available, when there is a threshold match between the sensor data and the item verification data.

10. The computer-implemented method of claim 7, further comprising:

when there is not a threshold match between the sensor data and the item verification data, adding the item to a list of unverified items;

wherein presenting the verification results comprises presenting, by the mobile computing device, a notification that an automated checkout option is unavailable, when the unverified items exceed a threshold value.

11. A computer system comprising:

one or more data processing apparatuses including one or more processors, memory, and storage devices storing instructions that, when executed, cause the one or more processors to perform operations comprising:

scanning an item, by a mobile computing device;

in response to scanning the item, providing, by the mobile computing device to a server system over a wireless network, a request for item verification data for verifying the item scanned by the mobile computing device, wherein the request for item verification data comprises an item identifier of the item scanned by the mobile computing device;

receiving, by the mobile computing device from the server system over the wireless network, the item verification data for verifying the item scanned by the mobile computing device, wherein the item verification data comprises item verification data corresponding to each of one or more item sensors of a shopping cart that is separate from the mobile computing device;

receiving, by the mobile computing device and from a cart computing system of the shopping cart that is separate from the mobile computing device, over a local wireless connection between the mobile computing device and the cart computing system of the shopping cart, sensor data that is collected by one or more item sensors of the shopping cart as a result of the item having been placed in the shopping cart;

performing, by the mobile computing device, a verification of the item based on the sensor data and the item verification data; and presenting, by the mobile computing device, verification results based on performing the verification of the item.

12. The computer system of claim 11, further comprising:

obtaining, by the mobile computing device, a cart identifier of the shopping cart;

wherein the request for item verification data comprises the cart identifier of the shopping cart.

13. The computer system of claim 11, further comprising:

in response to scanning the item, providing, by the mobile computing device to the cart computing system, instructions for the cart computing system to activate the one or more sensors of the shopping cart.

14. The computer system of claim 11, further comprising:

in response to scanning the item, starting, by the mobile computing device, a verification timer during which the mobile computing device waits for the sensor data and the item verification data to be received.

15. The computer system of claim 14, wherein the verification of the item is performed when the sensor data and the item verification data is received before the verification timer expires.

16. The computer system of claim 14, further comprising:

in response to determining that the verification timer has expired before receiving the sensor data, (i) presenting, by the mobile computing device, a prompt to add the item to the shopping cart, and (ii) restarting, by the mobile computing device, the verification timer.

17. The computer system of claim 11, wherein performing the verification of the item based on the sensor data and the item verification data comprises determining whether there is a threshold match between the sensor data and the item verification data, for each type of sensor that exists on the shopping cart.

18. The computer system of claim 17, wherein determining whether there is a threshold match between the sensor data and the item verification data comprises providing, for each type of sensor that exists on the shopping cart, the sensor data for the sensor type to a corresponding algorithm for the sensor type to generate a verification confidence score according to the sensor type, and aggregating the verification confidence scores to determine an overall verification confidence score for the item.

19. The computer system of claim 17, wherein presenting the verification results comprises presenting, by the mobile computing device, a notification that an automated checkout option is available, when there is a threshold match between the sensor data and the item verification data.

20. The computer system of claim 17, further comprising:

when there is not a threshold match between the sensor data and the item verification data, adding the item to a list of unverified items;

wherein presenting the verification results comprises presenting, by the mobile computing device, a notification that an automated checkout option is unavailable, when the unverified items exceed a threshold value.

* * * * *